US012786144B2

(12) United States Patent
Sapkal et al.

(10) Patent No.: US 12,786,144 B2
(45) Date of Patent: Nov. 3, 2026

(54) SENSOR INTERFACE ARCHITECTURE WITH ERROR DETECTION AND CONTROL

(71) Applicant: APPLE INC., Cupertino, CA (US)

(72) Inventors: Tanmay T. Sapkal, Sunnyvale, CA (US); Oren Kerem, Sunnyvale, CA (US); Wayne Eric Burk, San Jose, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 18/825,900

(22) Filed: Sep. 5, 2024

(65) Prior Publication Data

US 2026/0067238 A1 Mar. 5, 2026

(51) Int. Cl.
*H04L 49/90* (2022.01)

(52) U.S. Cl.
CPC .................................... *H04L 49/90* (2013.01)

(58) Field of Classification Search
CPC ....................................................... H04L 49/90
See application file for complete search history.

(56) References Cited

U.S. PATENT DOCUMENTS 5,787,085 A 7/1998 Fox
2012/0081580 A1* 4/2012 Cote ...................... H04N 25/00 348/E5.024
2016/0034809 A1 2/2016 Trenholm et al.
2019/0235485 A1 8/2019 Piety et al.
2020/0273133 A1 8/2020 Morris

FOREIGN PATENT DOCUMENTS

WO 9937048 A1 7/1999

OTHER PUBLICATIONS

International Search Report and Written Opinion issued in International Application No. PCT/US2025/044622, mailed Jan. 2, 2026, 6 pages.

* cited by examiner

*Primary Examiner* — Angela Widhalm De Rodriguez
(74) *Attorney, Agent, or Firm* — Sterne, Kessler, Goldstein & Fox P.L.L.C.

(57) ABSTRACT

The present disclosure describes a sensor interface (SIF) system with error detection and control. The system includes a sensor interface queue (SIFQ) coupled to a first sensor link and a second sensor link and including a first queue and a second queue. The system also includes a first data assembler coupled to the SIFQ and to a first signal processor. The first data assembler is configured to assemble the first set of data packets into first data in a first frame format for processing by the first signal processor and detect an error associated with assembling the first data in the first frame format. The system further includes a second data assembler coupled to the SIFQ and to a second signal processor. The second data assembler is configured to assemble the second set of data packets into second data in a second frame format for processing by the second signal processor.

20 Claims, 18 Drawing Sheets

SENSOR INTERFACE ARCHITECTURE WITH ERROR DETECTION AND CONTROL

BACKGROUND

Field

The present disclosure relates to a sensor interface architecture and systems.

Description

A sensor source device (or a sensor) can be a device, module, machine, or subsystem that detects and collects information in response to an input from a physical environment and sends the information to other electronics, such as a computer processor. The input can be light, heat, motion, moisture, pressure, or any number of other environmental phenomena. In some examples, a sensor can generate audio and visual information including images and videos. The audio and visual qualities, such as display quality, sound fidelity, smooth rendering, crispness of the display, lack of motion artifact, or other audio/visual (A/V) effects, can significantly impact functions performed and user experiences. With the ever increasing complexity of electronic systems and applications, sensor interface technology can have many challenges.

SUMMARY

Embodiments relate to a sensor interface (SIF) placed between sensor source devices and signal processors, such as image signal processors (ISP). A sensor source device can be referred to herein as a "sensor" or a "sensor source." In some embodiments, a sensor source can generate image related data and non-image related data, which can be transmitted through the SIF to one or more signal processors or memory subsystems for processing. Embodiments include a system that can include a sensor interface queue (SIFQ) coupled to a first sensor link and a second sensor link and including a first queue and a second queue, where the first queue is configured to store a first set of data packets received from the first sensor link, where the second queue is configured to store a second set of data packets received from the second sensor link, and where the first set of data packets and the second set of data packets share a same data packet format. The system also includes a first data assembler coupled to the SIFQ and to a first signal processor. The first data assembler is configured to assemble the first set of data packets into first data in a first frame format for processing by the first signal processor and to detect an error associated with assembling the first data in the first frame format. The system further includes a second data assembler coupled to the SIFQ and to a second signal processor. The second data assembler is configured to assemble the second set of data packets into second data in a second frame format for processing by the second signal processor.

Embodiments also include a method that can include assembling, by a first data assembler coupled to a sensor interface queue (SIFQ) and to a first signal processor, a first set of data packets into first data in a first frame format for processing by the first signal processor, where the SIFQ is coupled to a first sensor link and a second sensor link and comprising a first queue and a second queue. The method can also include storing, in the first queue, the first set of data packets received from the first sensor link; and storing, in the second queue, a second set of data packets received from the second sensor link, where the first set of data packets and the second set of data packets share a same data packet format. The method can further include detecting, by the first data assembler, an error associated with assembling the first data in the first frame format; and assembling, by a second data assembler coupled to the SIFQ and to a second signal processor, the second set of data packets into second data in a second frame format for processing by the second signal processor.

Embodiments further include a system with a sensor interface queue (SIFQ) including a first number of queues comprising a first queue and a second queue. The system also includes a second number of sensor links coupled to the SIFQ and including a first sensor link coupled to the first queue and a second sensor link coupled to the second queue, a sensor link being coupled to a corresponding sensor source, where the first queue is configured to store a first set of data packets received from the first sensor link, where the second queue is configured to store a second set of data packets received from the second sensor link, and where the first set of data packets and the second set of data packets share a same data packet format. The system also includes a third number of data assemblers including a first data assembler and a second data assembler, a data assembler being coupled to a corresponding signal processor. The first data assembler is coupled to the SIFQ and to a first signal processor and configured to assemble the first set of data packets into first data in a first frame format for processing by the first signal processor and detect an error associated with assembling the first data in the first frame format. Further, the second data assembler is coupled to the SIFQ and to a second signal processor and configured to assemble the second set of data packets into second data in a second frame format for processing by the second signal processor.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices can include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
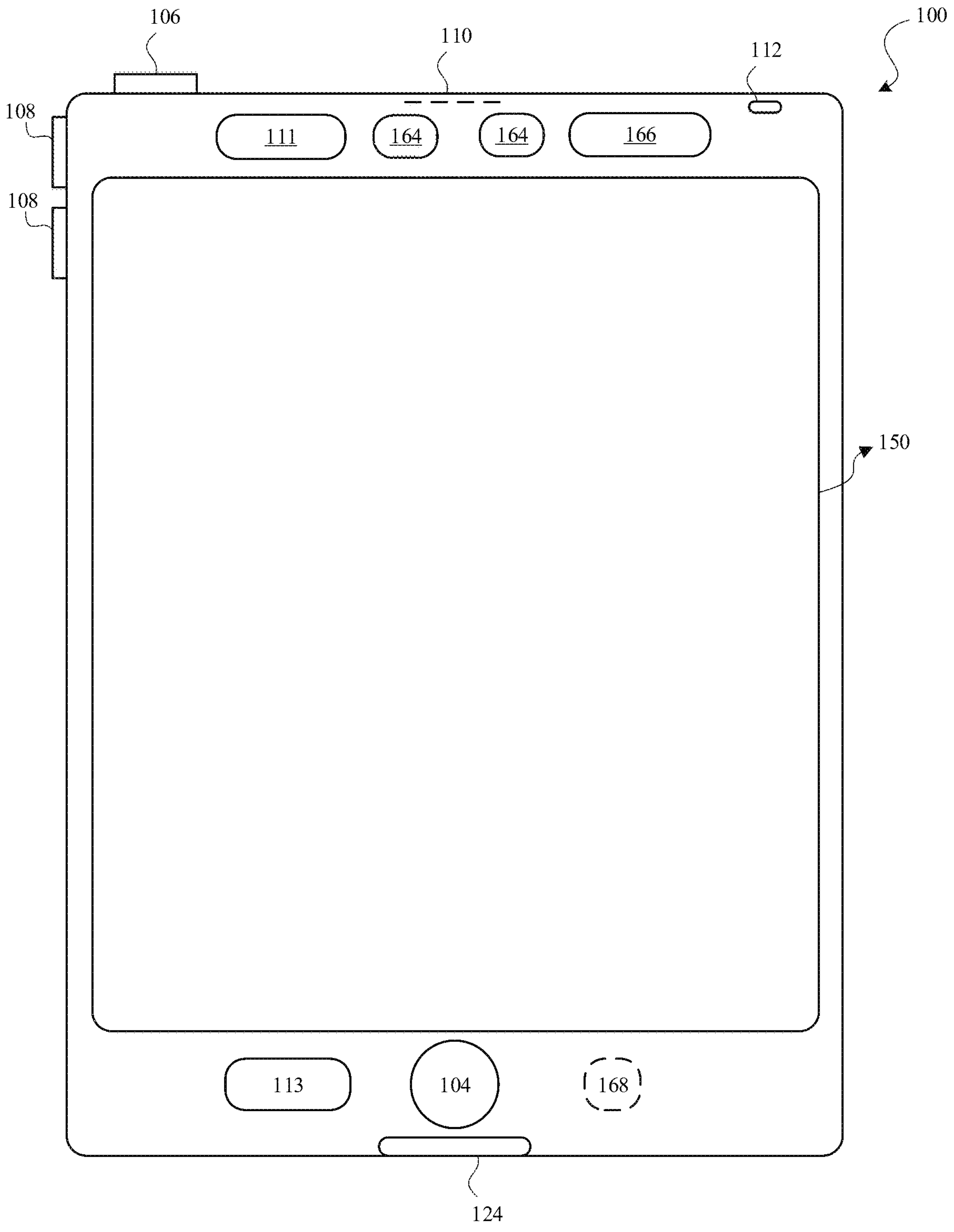
FIG. 1 is a high-level diagram of an electronic device, according to some embodiments

Figure (FIG. 1 is a high-level diagram of an electronic device 100, according to some embodiments. Device 100 may include one or more physical buttons, such as a “home” or menu button 104. Menu button 104 is used, for example, to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. Device 100 may include components not shown in FIG. 1, such as an ambient light sensor, a dot projector, and a flood illuminator.

Device 100 is an example of an electronic device and may have more or fewer components than listed above, some of which may be combined into a component or have a different configuration or arrangement. The various components of device 100 listed above are embodied in hardware, software, firmware, or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
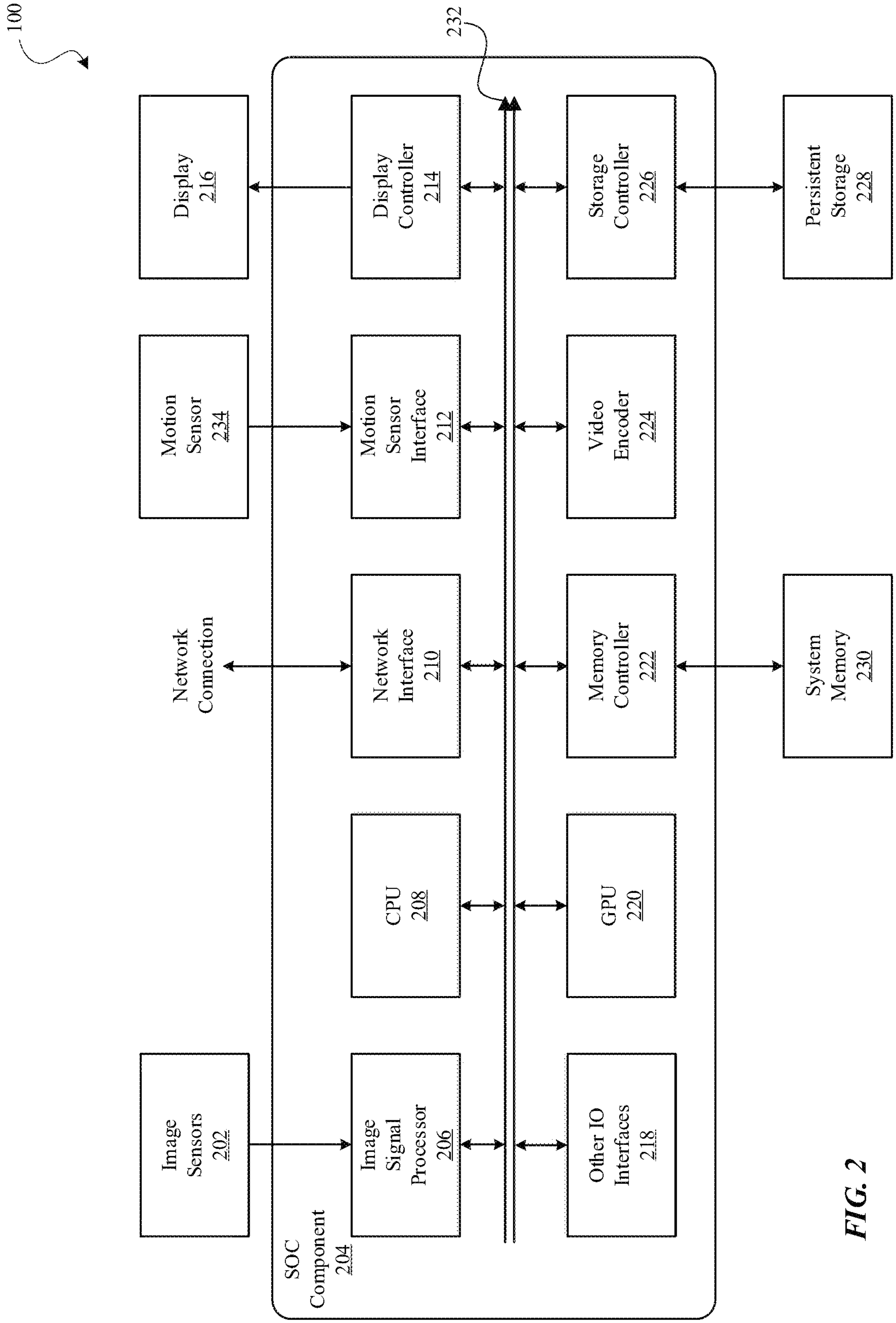
FIG. 2 is a block diagram illustrating components in the electronic device, according to some embodiments.

FIG. 2 is a block diagram illustrating components in device 100, according to some embodiments. Device 100 may perform various operations including image processing. For this and other purposes, device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230 or persistent storage 228, or sent to a remote computing device via network connection. The raw image data generated by image sensors 202 may be in a Bayer color filter array (CFA) pattern (hereinafter also referred to as a "Bayer pattern"). An image sensor 202 may also include optical and mechanical components that assist image sensing components (e.g., pixels) to capture images. The optical and mechanical components may include an aperture, a lens system, and an actuator that controls the lens position of image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations, such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM), or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations, such as image translation operations, horizontal and vertical scaling, color space conversion and/or image stabilization transformations, as described below in detail with reference to FIG. 3.

CPU 208 may be embodied using any suitable instruction set architecture and may be configured to execute instructions defined in that instruction set architecture. CPU 208 may be general-purpose or embedded processors using any of a variety of instruction set architectures (ISAs), such as the x86, PowerPC, SPARC, RISC, ARM MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices, such as keypads, buttons, audio devices, and sensors (e.g., a global positioning system). I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208, or GPU 220. Such software components may be stored in system memory 230, persistent storage 228, or another device communicating with device 100 via network interface 210.

Image data or video data may flow through various data paths within SOC component 204. In one example, raw image data may be generated from image sensors 202, processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than image sensors 202. For example, video data may be streamed, downloaded, or otherwise communicated to SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
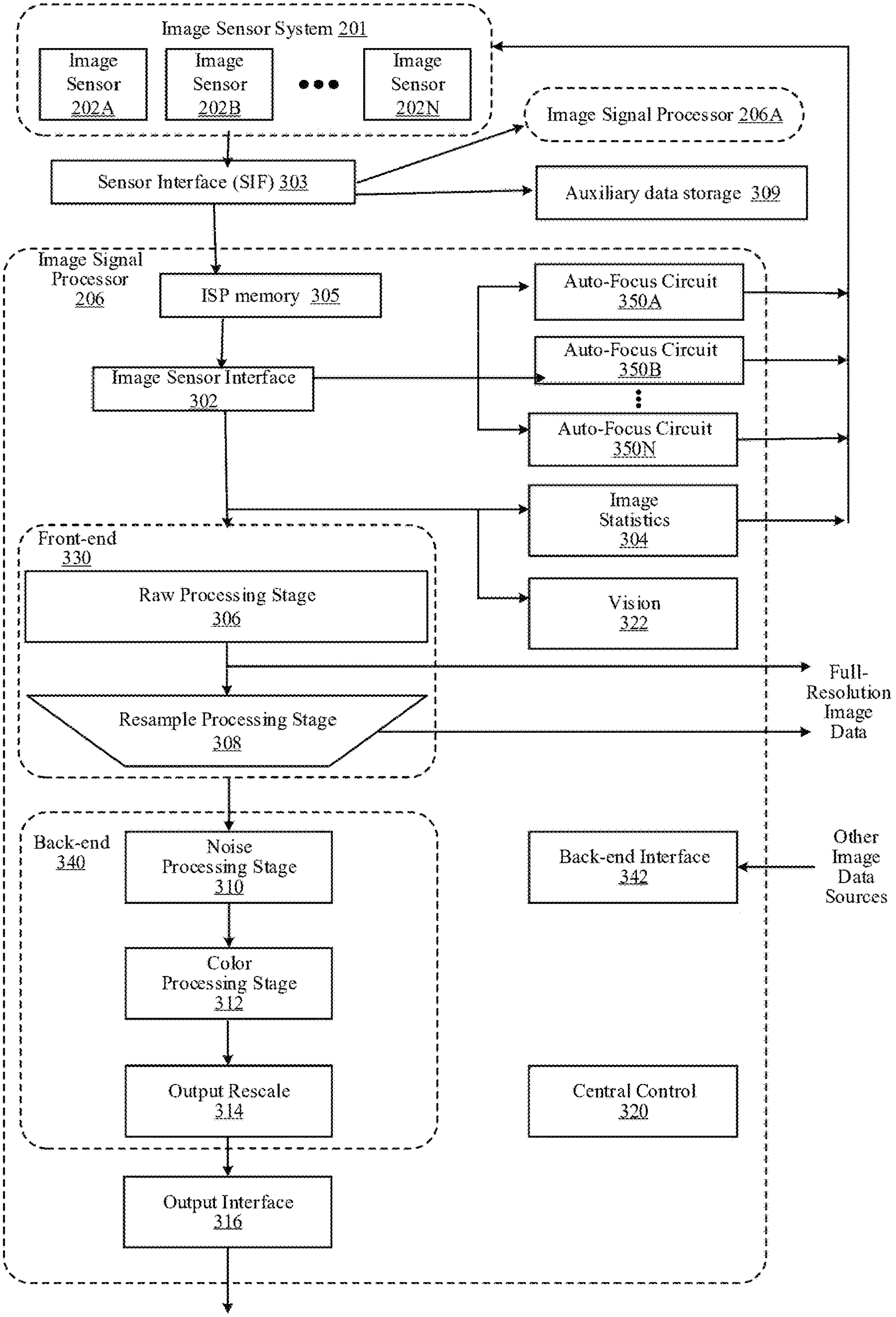
FIG. 3 is a block diagram illustrating image processing pipelines with image signal processors (ISP) and a sensor interface (SIF) system, according to some embodiments.

FIG. 3 is a block diagram illustrating image processing pipelines with ISP 206 coupled to sensor interface (SIF) 303, according to some embodiments. In the embodiment of FIG. 3, multiple ISP processors, such as ISP 206 and ISP 206A can be coupled to an image sensor system 201 that includes one or more image sensors 202A through 202N (hereinafter collectively referred to as "image sensors 202" or also referred individually as "image sensor 202") to receive raw image data. Similarly, ISP 206 or ISP 206A or both can be referred to as "ISP 206." Image sensor system 201 may include one or more sub-systems that control image sensors 202 individually. In some cases, each image sensor 202 may operate independently while, in other cases, image sensors 202 may share some components. For example, in some embodiments, two or more image sensors 202 may share the same circuit board that controls the mechanical components of the image sensors (e.g., actuators that change the lens positions of each image sensor). The image sensing components of image sensor 202 may include different types of image sensing components that may provide raw image data in different forms to ISP 206. For example, the image sensing components may include focus pixels that are used for auto-focusing and image pixels that are used for capturing images. In some embodiments, the image sensing pixels may be used for both auto-focusing and image capturing purposes.

In some embodiments, SIF 303 can move data from image sensors 202 to the memory subsystem or image processing pipes of ISP 206. SIF 303 can provide buffering and error detection in a real time system. Additional details of SIF 303 are described in FIGS. 4-16. SIF 303 can be coupled to ISP 206 and 206A. In addition, SIF 303 can be coupled to an auxiliary data storage 309.

ISP 206 can implement an image processing pipeline that may include a set of stages that process image information from creation, capture, or receipt to output. ISP 206 may include, among other components, ISP memory 305, image sensor interface 302, central control module 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuit 350"). ISP 206 may include other components, such as memory modules, not illustrated in FIG. 3 or may omit one or more components illustrated in FIG. 3. ISP 206A can have the same or a similar implementation as ISP 206.

In some embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In some embodiments, data captured by image sensors 202 can be transmitted through sensor interface 303 and stored in ISP memory 305 before being transmitted to other components for further processing. In some embodiments, raw image data corresponding to the focus pixels may be sent to auto-focus circuits 350, while raw image data corresponding to the image pixels may be sent to image sensor interface 302. In some embodiments, raw image data corresponding to both types of pixels may simultaneously be sent to both auto-focus circuits 350 and image sensor interface 302.

Auto-focus circuits 350 may include hardware circuits that analyze raw image data to determine an appropriate lens position of each image sensor 202. In some embodiments, the raw image data may include data that is transmitted from image sensing pixels that specializes in image focusing. In some embodiments, raw image data from image capture pixels may also be used for auto-focusing purposes. An auto-focus circuit 350 may perform various image processing operations to generate data that determines the appropriate lens position. The image processing operations may include cropping, binning, image compensation, scaling to generate data that is used for auto-focusing purposes. The auto-focusing data generated by auto-focus circuits 350 may be fed back to image sensor system 201 to control the lens positions of image sensors 202. For example, an image sensor 202 may include a control circuit that analyzes the auto-focusing data to determine a command signal that is sent to an actuator associated with the lens system of the image sensor to change the lens position of the image sensor. The data generated by auto-focus circuits 350 may also be sent to other components of the ISP 206 for other image processing purposes. For example, some of the data may be sent to image statistics module 304 to determine information regarding auto-exposure.

Auto-focus circuits 350 may be individual circuits that are separate from other components, such as image statistics module 304, image sensor interface 302, front-end 330 and back-end 340. This allows ISP 206 to perform auto-focusing analysis independent of other image processing pipelines. For example, ISP 206 may analyze raw image data from image sensor 202A to adjust the lens position of image sensor 202A using auto-focus circuit 350A while performing downstream image processing of the image data from image sensor 202B simultaneously. In some embodiments, the number of auto-focus circuits 350 may correspond to the number of image sensors 202. In other words, each image sensor 202 may have a corresponding auto-focus circuit that is dedicated to the auto-focusing of image sensor 202. Device 100 may perform auto focusing for different image sensors 202 even if one or more image sensors 202 are not in active use. This allows a seamless transition between two image sensors 202 when device 100 switches from one image sensor 202 to another. For example, device 100 may include a wide-angle camera and a telephoto camera as a dual back camera system for photo and image processing. Device 100 may display images captured by one of the dual cameras and may switch between the two cameras from time to time. The displayed images may seamlessly transition from image data captured by one image sensor 202 to image data captured by another image sensor without waiting for the second image sensor 202 to adjust its lens position because two or more auto-focus circuits 350 may continuously provide auto-focus data to image sensor system 201.

Raw image data captured by different image sensors 202 may also be transmitted to image sensor interface 302. Image sensor interface 302 receives raw image data from image sensor 202 and processes the raw image data into image data processed by other stages in the pipeline. Image sensor interface 302 may perform various preprocessing operations, such as image cropping, binning, and scaling, to reduce image data size. In some embodiments, pixels are sent from image sensor 202 to image sensor interface 302 in raster order (e.g., horizontally, line by line). The subsequent processes in the pipeline may also be performed in raster order and the result may also be outputted in raster order. Although only a single image sensor and a single image sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. Raw image data may be in Bayer raw format, for example. In Bayer raw image format, pixel data with values specific to a particular color (instead of all colors) is provided in each pixel. In an image capturing sensor, image data can be provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset, and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a drop off in intensity roughly proportional to a distance from a lens optical center. White balance gain refers to providing digital gains for white balance, offset, and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, a demosaic operation, a per-pixel color correction operation, a Gamma mapping operation, a color space conversion, and downscaling or sub-band splitting. The demosaic operation refers to converting or interpolating missing color samples from raw image data (e.g., in a Bayer pattern) to output image data into a full-color domain. The demosaic operation may include low pass directional filtering on the interpolated samples to obtain full-color pixels. The per-pixel color correction operation refers to a process of performing color correction on a per-pixel basis using information about relative noise standard deviations of each color channel to correct color without amplifying noise in the image data. The Gamma mapping operation refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. The color space conversion refers to converting color space of an input image data into a different format. In some embodiments, resample processing stage 308 converts RGB format into YCbCr format for further processing. In some embodiments, YcbCr can be referred to as "Y'CbCr" or "Y Pb/Cb Pr/Cr," which can be also written as "YCBCR" or "Y'CBCR" and is a family of color spaces used as a part of the color image pipeline in video and digital photography systems. Y' is the luma component and CB and CR are the blue-difference and red-difference chroma components.

Central control module 320 may control and coordinate an overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with image sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way, full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replacing patterned defective pixels, sub-sampling raw image data, detecting and replacing non-patterned defective pixels, black level compensation, lens shading correction, and inverse black level compensation. After performing one or more of such operations, statistics information, such as 3A statistics (Auto white balance (AWB), auto exposure (AE), histograms (e.g., 2D color or component)) and any other image data information, may be collected or tracked. In some embodiments, certain pixel values, or areas of pixel values, may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In some embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include a subsampling or binning operation and computation of luminance if the input image data is not in YCrCb format. Global mapping and Gamma correction can be performed on the pre-processed data on a luminance image. Vision noise filtering is performed to remove pixel defects and reduce noise present in the image data, and thereby, improve the quality and performance of subsequent computer vision algorithms. Such vision noise filtering may include detecting and fixing dots or defective pixels and performing bilateral filtering to reduce noise by averaging neighbor pixels of similar brightness. Various vision algorithms use images of different sizes and scales. Resizing of an image is performed, for example, by binning or linear interpolation operation. Key points are locations within an image that are surrounded by image patches well suited to matching in other images of the same scene or object. Such key points are useful in image alignment, computing camera pose and object tracking. Key point detection refers to the process of identifying such key points in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. Operations performed by back-end interface 342 include converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiments, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In some embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement a series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Sensor Interface

Figure 4:
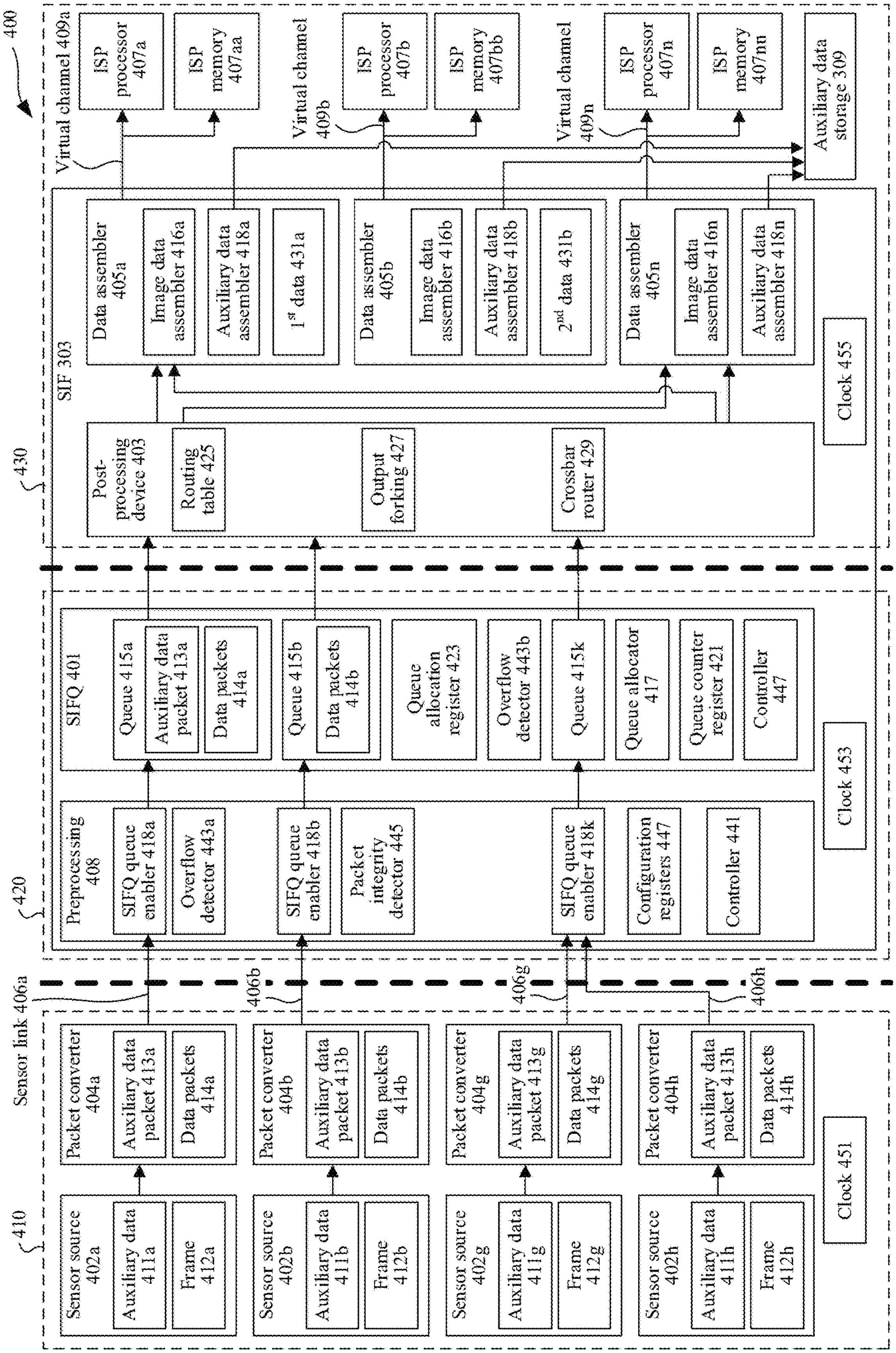
FIG. 4 is a block diagram illustrating a SIF system, according to some embodiments.

FIG. 4 is a block diagram illustrating a SIF system 400, according to some embodiments. SIF system 400 can include a SIF 303 with additional components and devices. In some embodiments, SIF system 400 can include a subsystem 410, a subsystem 420, and a subsystem 430. In some embodiments, components, circuits, and devices of subsystem 410 can be configured to be operated based on a first clock signal generated by a clock 451 with a first frequency; while components, circuits, and devices of subsystem 420 can be configured to be operated based on a second clock signal generated by a clock 453 with a second frequency different from the first frequency. In some embodiments, components, circuits, and devices of subsystem 430 can be configured to be operated based on a third clock signal generated by a clock 455 with a third frequency, which can be different from at least one of the first frequency or the second frequency.

In some embodiments, SIF 303 is placed between a number of ISP processors, such as n ISP processors 407*a*, 407*b*, . . . , and 407*n*, and a number of sensor sources, such as h sensor sources 402*a*, 402*b*, . . . , 402*g*, and 402*h*, to move data from the h sensor sources to the n ISP processors. In some embodiments, any ISP processor, such as ISP processor 407*a*, can be an example of ISP 206, as shown in FIG. 3. Similarly, any sensor source, such as sensor source 402*a*, can be an example of image sensor 202A as shown in FIG. 3. In addition, SIF 303 can be coupled to auxiliary data storage 309. In some embodiments, a sensor source, e.g., sensor source 402*a*, can be a device that detects or measures a physical property and records, indicates, or otherwise responds to it. A sensor source, e.g., sensor source 402*a*, can convert a physical phenomenon into a measurable analog voltage (or a digital signal) converted into a human-readable display or transmitted for reading or further processing. In some embodiments, a sensor source can be a camera or any other audio/video sensors.

In some embodiments, SIF 303 can include SIF queue (SIFQ) 401 that includes a number of queues, such as k queues 415*a*, 415*b*, . . . , 415*k*, and a number of data assemblers, such as n data assemblers 405*a*, 405*b*, . . . , 405*n*. The number of data assemblers n can be the same as the number of ISP processors n so that each ISP processor can have a corresponding data assembler. Accordingly, a data assembler, such as data assemblers 405*a*, 405*b*, . . . , 405*n*, can be identified by a virtual channel between the data assembler and the corresponding signal processor. For example, data assembler 405*a* can be identified by a virtual channel 409*a* between data assembler 405*a* and ISP processor 407*a*, data assembler 405*b* can be identified by a virtual channel 409*b* between data assembler 405*b* and ISP processor 407*b*, . . . , and data assembler 405*n* can be identified by a virtual channel 409*n* between data assembler 405*n* and ISP processor 407*n*. A virtual channel can be identified by an associated virtual channel identifier. In some embodiments, a virtual channel and a virtual channel identifier can be used interchangeably. In addition, each ISP processor can have a corresponding memory device coupled to the data assembler. For example, data assembler 405*a* is coupled to ISP memory 407*aa* through virtual channel 409*a*, data assembler 405*b* is coupled to ISP memory 407*bb* through virtual channel 409*b*, . . . , and data assembler 405*n* is coupled to ISP memory 407*nn* through virtual channel 409*n*. Furthermore, one or more of data assemblers 405*a*, 405*b*, . . . 405*n* can be coupled to auxiliary data storage 309.

In some embodiments, the number of sensor sources h, the number of queues k, and the number of ISP processors n can be different from each other. In some embodiments, the number of sensor sources h can be different from at least one of the number of queues k and the number of ISP processors n. The different numbers for h, k, and n can facilitate flexibility in moving data from the h sensor sources to the n ISP processors, where the k queues can be used in SIF 303. In some embodiments, each queue of the k queues 415*a*, 415*b*, . . . , 415*k* of SIFQ 401 can have the same queue size. In some embodiments, a first queue of the k queues 415*a*, 415*b*, . . . , 415*k* of SIFQ 401 can have a queue size different from a second queue of the k queues 415*a*, 415*b*, . . . , 415*k*. In some embodiments, the number of queues k can be higher than the number of sensor sources h or the number of ISP processors n. In some embodiments, the number of sensor sources h can be changed dynamically at different times since one or more sensor sources can be connected or dropped from being connected to SIF 303. When the number of queues k is higher than the number of sensor sources h, multiple queues can be allocated to one sensor source when the sensor source generates higher number of frames or packets in comparison with other sensor sources. To facilitate the different numbers for h, k, and n, SIF system 400 use multiple stages of circuits arranged in a specific way as shown in FIG. 4, which can be more efficient and result in hardware savings compared to other implementations.

In some embodiments, SIF 303 can include a preprocessing device 408 and a post-processing device 403 coupled to SIFQ 401. In some embodiments, preprocessing device 408 can include a number of queue enablers, one queue enabler for each queue of SIFQ 401. In some embodiments, a queue enabler 418*a* is coupled to queue 415*a*, a queue enabler 418*b* is coupled to queue 415*b*, . . . , and a queue enabler 418*k* is coupled to queue 415*k*. In some embodiments, a queue enabler can also be referred to as a "queue enabler circuit." In some embodiments, SIFQ preprocessing device 408 can include a controller 441, an overflow detector 443*a* to detect a queue overflow for one or more queues of SIFQ 401, a packet integrity detector 445 for detecting packet errors for any individual packet. In some embodiments, SIFQ preprocessing device 408 can include various configuration registers 447 to store configuration parameters for configuring SIFQ 401 and other devices and components.

In some embodiments, a queue of SIFQ 401 can be allocated to one or more sensor sources, where each sensor source can be coupled to a queue through a sensor link. In some embodiments, a sensor source can be coupled to a queue going through a sensor link coupled to a packet converter and the sensor source. In some embodiments, sensor source 402*a* can be coupled to a packet converter 404*a*, which can be coupled to queue enabler 418*a* through sensor link 406*a*. Similarly, sensor source 402*b* can be coupled to a packet converter 404*b*, which can be coupled to queue enabler 418*b* through a sensor link 406*b*; sensor source 402*g* can be coupled to a packet converter 404*g*, which can be coupled to a queue enabler 418*k* through a sensor link 406*g*; and sensor source 402*h* can be coupled to a packet converter 404*h*, which can be coupled to queue enabler 418*k* through a sensor link 406*h*. Accordingly, there can be multiple packet converters and sensor sources coupled to one queue enabler and a queue. Packet converter 404*g* and packet converter 404*h* can both be coupled to queue enabler 418*k*. In some embodiments, packet converter 404*a* . . . packet converter 404*h* can be included as a part of SIF 303. In some embodiments, packet converter 404*a* . . . packet converter 404*h* can be separated from SIF 303. The number of packet converters, e.g., packet converter 404*a* . . . packet converter 404*h*, can correspond to the number of sensor source 402*a* . . . sensor source 402*h*. In some embodiments, the number of packet converters, e.g., packet converter 404*a* . . . packet converter 404*h*, can be smaller than the number of sensor source 402*a* . . . sensor source 402*h*.

In some embodiments, a sensor link, such as sensor link 406*a*, sensor link 406*b*, . . . , sensor link 406*g*, sensor link 406*h*, can be coupled to one or more queues of SIFQ 401 through SIFQ preprocessing device 408. SIFQ 401 can include a queue counter register 421 configured to store a queue counter indicator to indicate a number of queues allocated to a sensor source through a sensor link. SIFQ 401 can further include an overflow detector 443*b* to detect overflow in a queue with respect to its capacity. In some embodiments, a queue of SIFQ 401 can be configured to be allocated to a first sensor source at a first time instance and allocated to a second sensor source at a second time instance, where the second time instance is separated from the first time instance by an idle period for the first sensor source. Accordingly, at a first time instance, queue 415*a* can be allocated or assigned to sensor source 402*a* and maintain the allocation until sensor source 402*a* stops operation to enter an idle period. Once sensor source 402*a* enters an idle period, queue 415*a* can be reallocated to another sensor source, such as sensor source 402*b*.

In some embodiments, a sensor source can generate a number of frames in various frame formats. In some embodiments, sensor source 402*a* can generate frame 412*a* according to a first frame format, sensor source 402*b* can generate frame 412*b* according to a second frame format, . . . , sensor source 402*g* can generate frame 412*g* according to a g-th frame format, sensor source 402*h* can generate frame 412*h* according to a h-th frame format. In some embodiments, the first frame format can be different from the second frame format, . . . , the g-th frame format, or the h-th frame format.

In some embodiments, a frame, in a video context, can be a single still image that, when played in sequence with the other frames of the video, creates motion on the playback surface. Accordingly, a frame can include multiple pixels of the still image. A frame format can be a format to encode data to represent the still image. In some embodiments, the second frame format, the third frame format, . . . the g-th frame format, or the h-th frame can be selected from a Mobile Industry Processor Interface (MIPI) format, a camera interface format, a Camera Parallel Interface (CPI) format, a Camera Serial Interface (CSI) format, a Display Serial Interface (DSI) format, a Low Power Display Port (LPDP) format, an Apple Camera Interface (ACI) format, a DisplayPort (DP) format, or some other suitable audio or video format. In some embodiments, a frame format may include a format for the packets of the frames. In some embodiments, SIF 303 can receive input data packets from sensor sources in MIPI format, LPDP format, and ACI format. Incoming data packets from sensor sources in MIPI format and in LPDP format, in LPDP-C format can be converted to ACI data packets to simplify the downstream design. In some embodiments, ACI data packets can include 32 bit symbols that are packed over a 128 bit bus for transmission.

In some embodiments, a sensor source can generate auxiliary data which is non-image related data. In some embodiments, sensor source 402*a* can generate auxiliary data 411*a*, sensor source 402*b* can generate auxiliary data 411*b*, . . . , sensor source 402*g* can generate auxiliary data 411*g*, and sensor source 402*h* can generate auxiliary data 411*h*. In some embodiments, auxiliary data, such as auxiliary data 411*a*, 411*b*, . . . , 411*g*, or 411*h*, can include sideband data, metadata for a frame generated by the sensor source or information data about an image generated by the sensor source.

In some embodiments, a packet converter can be coupled to a sensor source and configured to generate a set of data packets, where a first set of data packets generated by a first packet converter coupled to a first sensor source and a second set of data packets generated by a second packet converter coupled to a second sensor source can share the same data packet format. In some embodiments, packet converter 404*a* coupled to sensor source 402*a* can generate a set of data packets 414*a* for frame 412*a* generated by sensor source 402*a* and further generate a set of auxiliary data packet 413*a* for auxiliary data 411*a* generated by sensor source 402*a*, where auxiliary data packet 413*a* and data packets 414*a* can have the same data packet format. Similarly, packet converter 404*b* coupled to sensor source 402*b* can generate a set of data packets 414*b* for frame 412*b* generated by sensor source 402*b* and further generate a set of auxiliary data packet 413*b* for auxiliary data 411*b* generated by sensor source 402*b*. In addition, packet converter 404*g* coupled to sensor source 402*g* can generate a set of data packets 414*g* for frame 412*g* generated by sensor source 402*g* and further generate a set of auxiliary data packet 413*g* for auxiliary data 411*g* generated by sensor source 402*g*. Furthermore, packet converter 404*h* coupled to sensor source 402*h* can generate a set of data packets 414*h* for frame 412*h* generated by sensor source 402*h* and further generate a set of auxiliary data packet 413*h* for auxiliary data 411*h* generated by sensor source 402*h*.

In some embodiments, the data packet format for data packets 414*a*, data packets 414*b*, . . . , data packets 414*g*, and data packets 414*h* can be the same data packet format. Accordingly, sensor source 402*a*, sensor source 402*b*, . . . , sensor source 402*g*, and sensor source 402*h* can generate frames 411*a*, 411*b*, . . . , 411*g*, and 411*h* in different frame formats, while packet converters 404*a*, 404*b*, . . . , 404*g*, and 404*h* can convert the different frame formats for frames 411*a*, 411*b*, . . . , 411*g*, and 411*h* into the same data packet format to be processed by SIF 303. In some embodiments, the data packet format for data packets 414*a*, data packets 414*b*, . . . , data packets 414*g*, data packets 414*h*, or auxiliary data packets 413*a*, 413*b*, . . . , 413*g*, 413*h*, can be different from any of the frame formats for frames 411*a*, 411*b*, . . . , 411*g*, and 411*h*. The same data packet format is generated to facilitate the transmission of the frames generated by the sensor sources. In some embodiments, a frame containing an entire image can be too large to be transmitted as a unit from a sensor source to a processor for processing. Accordingly, converting a frame into multiple data packets can increase the speed of transmission. Multiple sensor sources can generate frames in different frame formats, which are converted into a uniform packet format for transmission.

In some embodiments, in addition to the k queues 415*a*, 415*b*, . . . , 415*k*, SIFQ 401 can include a queue allocator 417, a controller 447, overflow detector 443*b*, a queue allocation register 423, queue counter register 421, or some other suitable registers for various purposes. In some embodiments, controller 447 can implement, control, or coordinate functions of other components, such as queue allocator 417. In some embodiments, queue allocator 417 can receive a queue request from a packet converter through a sensor link and allocate a queue to the sensor source coupled to the queue through the packet converter and the sensor link. In some embodiments, queue allocator 417 can receive a queue request from packet converter 404*a* through sensor link 406*a* and allocate queue 415*a* to sensor source 402*a* coupled to queue 415*a* through packet converter 404*a* and sensor link 406*a*. In some embodiments, queue allocator 417 can be further configured to inform packet converter 404*a* that queue 415*a* is allocated to sensor source 402*a*. In some embodiments, queue allocator 417 can be configured to advertise to the corresponding sensor source of sensor links 406*a*, 406*b*, . . . , 406*h* that a number of queues among the k queues of SIFQ 401 are available for sensor sources 402*a*, 402*b*, . . . , 402*h* and can further enable the number of queues for accepting data packets generated based on frames from the sensor sources. Accordingly, the k queues of SIFQ 401 can be shared by sensor sources 402*a*, 402*b*, . . . , 402*h*, which can be different from a design where a queue serves a single sensor source. At a different time, a queue of the k queues of SIFQ 401 can be allocated to different sensor sources. Accordingly, the sharing of the k queues of SIFQ 401 among the different sensor sources 402*a*, 402*b*, . . . , 402*h* at different time instances can improve the operational efficiency and provide flexibility so that different number of sensor sources can be attached to SIF system 400.

In some embodiments, a queue of SIFQ 401 can be allocated to a single sensor source at a time instance. Hence, each packet stored in a queue of SIFQ 401 is from the same sensor source at a time instance. In some embodiments, a queue can be switched to be assigned to another sensor source after the previous allocated sensor source is in an idle state without generating any new frames. Accordingly, queue allocator 417 can allocate a queue, e.g., queue 415*a*, to a first sensor source, e.g., sensor source 402*a*, at a first time instance, and further allocate queue 415*a* to a second sensor source 402*b* through sensor link 406*b* at a second time instance, where the second time instance is separated from the first time instance by an idle period for the first sensor source.

In some embodiments, queue allocator 417 can be configured to allocate queue 415*a* to sensor source 402*a* through sensor link 406*a* to store a first set of data packets 414*a* received through sensor link 406*a*. In addition, queue allocator 417 can be configured to allocate queue 415*b* to sensor source 402*b* through sensor link 406*b* to store a second set of data packets 414*b* received through sensor link 406*b*. Afterwards, the first set of data packets 414*a* can be routed through post-processing device 403 to reach data assembler 405*a*, and the second set of data packets 414*b* can be routed through post-processing device 403 to reach data assembler 405*b*. In some embodiments, data assembler 405*a* can include image data assembler 416*a* and an auxiliary data assembler 418*a*. Image data assembler 416*a* can be configured to assemble the first set of data packets 414*a* into first data 431*a* in a first frame format for processing by ISP processor 407*a*, where the first frame format is the same frame format for frame 412*a* generated by sensor source 402*a*. In some embodiments, first data 431*a* can be the same as frame 412*a*. In some embodiments, first data 431 can include additional information generated based on error detection mechanisms or other additional functions. Auxiliary data assembler 418*a* can receive auxiliary data packets 413*a* from queue 415*a* and transmit auxiliary data packets 413*a* to auxiliary data storage 309. Similarly, data assembler 405*b* can include image data assembler 416*b* and an auxiliary data assembler 418*b*. Image data assembler 416*b* can be configured to assemble the second set of data packets 414*b* into second data 431*b* in a second frame format for processing by ISP processor 407*b*, where the second frame format is the same frame format for frame 412*b* generated by sensor source 402*b*. In addition, data assembler 405*n* can include image data assembler 416*n* and an auxiliary data assembler 418*n*. Image data assembler 416*n* can be configured to assemble a set of data packets into data in an n-th frame format for processing by ISP processor 407*n*.

In some embodiments, SIFQ 401 can be configured to receive auxiliary data packets 413*a* from packet converter 404*a* through sensor link 406*a*, where auxiliary data packets 413*a* are generated by packet converter 404*a* based on auxiliary data 411*a* generated by sensor source 402*a*. SIFQ 401 can also be configured to store auxiliary data packets 413*a* in queue 415*a* allocated to sensor source 402*a*. In some embodiments, an auxiliary data packet of auxiliary data packets 413*a* can include a header indicating the auxiliary data packet as an auxiliary data that is a non-image data. On the other hand, a data packet of the first set of data packets 414*a* can include a header indicating the data packet is image data.

In some embodiments, post-processing device 403 can be coupled to the k queues, 415*a*, 415*b*, . . . , 415*k* of SIFQ 401 and the n data assemblers 405*a*, 405*b*, . . . , 405*n*, Post-processing device 403 can include a routing table 425, a crossbar router 429, and an output forking device 427. In some embodiments, a data packet of the first set of data packets can include a header including the first virtual channel identifier. Post-processing device 403 can be configured to route the first set of data packets 414*a* to data assembler 405*a* based on virtual channel identifier 409*a* in the header of the data packets and to route the second set of data packets 414*b* to data assembler 405*b* based on virtual channel identifier 405*b* in the header of the data packets.

In some embodiments, crossbar router 429 of post-processing device 403 can be configured to couple one or more queues of the k queues of SIFQ 401 to one or more data assemblers of the n data assemblers 405*a*, 405*b*, . . . , 405*n*. Post-processing device 403 can be further configured to classify auxiliary data packets into an auxiliary data stream and to classify the first set of data packets into a first data stream. In some embodiments, post-processing device 403 can operate in an idle state in response to a virtual channel, such as virtual channel 409*a*, 409*b*, or 409*n*, to be in an idle state. Post-processing device 403 can further transmit from the idle state to a processing state in response to a start of a frame packet being detected.

In some embodiments, subsystem 410 can include the h number of sensor sources 402*a*, 402*b*, . . . 402*g*, and 402*h*, and the h number of packet converter 404*a*, 404*b*, . . . 404*g*, and 404*h*; subsystem 420 can include preprocessing device 408 and SIFQ 401; subsystem 430 can include post-processing device 403, the n data assemblers 405*a*, 405*b*, . . . , 405*n*, and the n ISP processors 407*a*, 407*b*, . . . , 407*n*. In some embodiments, components, circuits, and devices of subsystem 410 can be configured to be operated based on the first clock signal generated by clock 451 with the first frequency; while components, circuits, and devices of subsystem 420 can be configured to be operated based on the second clock signal generated by clock 453 with the second frequency different from the first frequency. In some embodiments, components, circuits, and devices of subsystem 430 can be configured to be operated based on the third clock signal generated by clock 455 with the third frequency, which can be different from at least one of the first frequency or the second frequency.

In some embodiments, queue 415*a* can be configured to store data packets 414*a*, and queue 415*b* can be configured to store data packets 414*b*, where queue 415*a* and queue 415*b* operate based on the second clock signal generated by clock 453 with the second frequency. In addition, data packets 414*a* can be generated based on the first clock signal generated by clock 451 with a first frequency different from the second frequency. Furthermore, data assembler 405*a* can assemble data packets 414*a* into first data 431*a* in a first frame format for processing by ISP processor 407*a*, and data assembler 405*b* can assemble data packets 414*b* into second data 431*b* in the second frame format for processing by ISP processor 407*b*, where data assembler 405*a*, data assembler 405*b*, ISP processor 407*a*, ISP processor 407*b* can be configured to be operated based on the third clock signal generated by clock 455 with the third frequency. In some embodiments, the third frequency can be different from the first frequency, the second frequency, or both.

In some embodiments, packet converter 404*a* can operate based on the first clock signal generated by clock 451 with the first frequency to generate data packets 414*a* for frame 412*a* generated by sensor source 402*a*. Similarly, packet converter 404*b* can operate based on the first clock signal generated by clock 451 with the first frequency to generate data packets 414*b* for frame 412*b* generated by sensor source 402*b*. In some embodiments, packet converter 404*a* can generate auxiliary data packets 413*a* based on the first clock signal generated by clock 451 with the first frequency.

In some embodiments, preprocessing device 408 can operate based on the second clock signal generated by clock 453 with the second frequency. Accordingly, queue enabler 418*a* can be configured to enable SIFQ 401 to receive data packets 414*a* from sensor link 406*a*, where queue enabler 418*a* can operate based on the second clock signal generated by clock 453 with the second frequency. Similarly, queue enabler 418*b* can be configured to enable SIFQ 401 to receive data packets 414*b* from sensor link 406*b*, where queue enabler 418*b* can operate based on the second clock signal generated by clock 453 with the second frequency.

In some embodiments, post-processing device 403 can be configured to route data packets 414*a* to data assembler 416*a* based on virtual channel identifier 409*a* included in data packets 414*a*. Post-processing device 403 can also be configured to route data packets 414*b* to data assembler 416*b* based on virtual channel identifier 409*b* included in data packets 414*b*. Post-processing device 403 can operate based on the third clock signal generated based on clock 455 with a third frequency.

In some embodiments, SIF system 400 can include an asynchronous queue (not shown) placed across the boundary between subsystem 410 and subsystem 420. Accordingly, an asynchronous queue can be coupled to a sensor link, e.g., sensor link 406*a* of subsystem 410 and SIFQ 401 of subsystem 420. The asynchronous queue can be configured to receive a set of data packets at the first frequency of the first clock signal generated by clock 451 and store the set of data packets. In addition, the asynchronous queue can transmit the set of data packets out of the asynchronous queue at the second frequency of the second clock signal generated by clock 453. In some embodiments, queue enabler 418*a* can be coupled to sensor link 406*a* and the asynchronous queue and configured to enable SIFQ 401 to receive data packets 414*a* from sensor link 406*a*, where queue enabler 418*a* can operate based on the second clock signal with the second frequency generated by clock 453.

Figure 5:
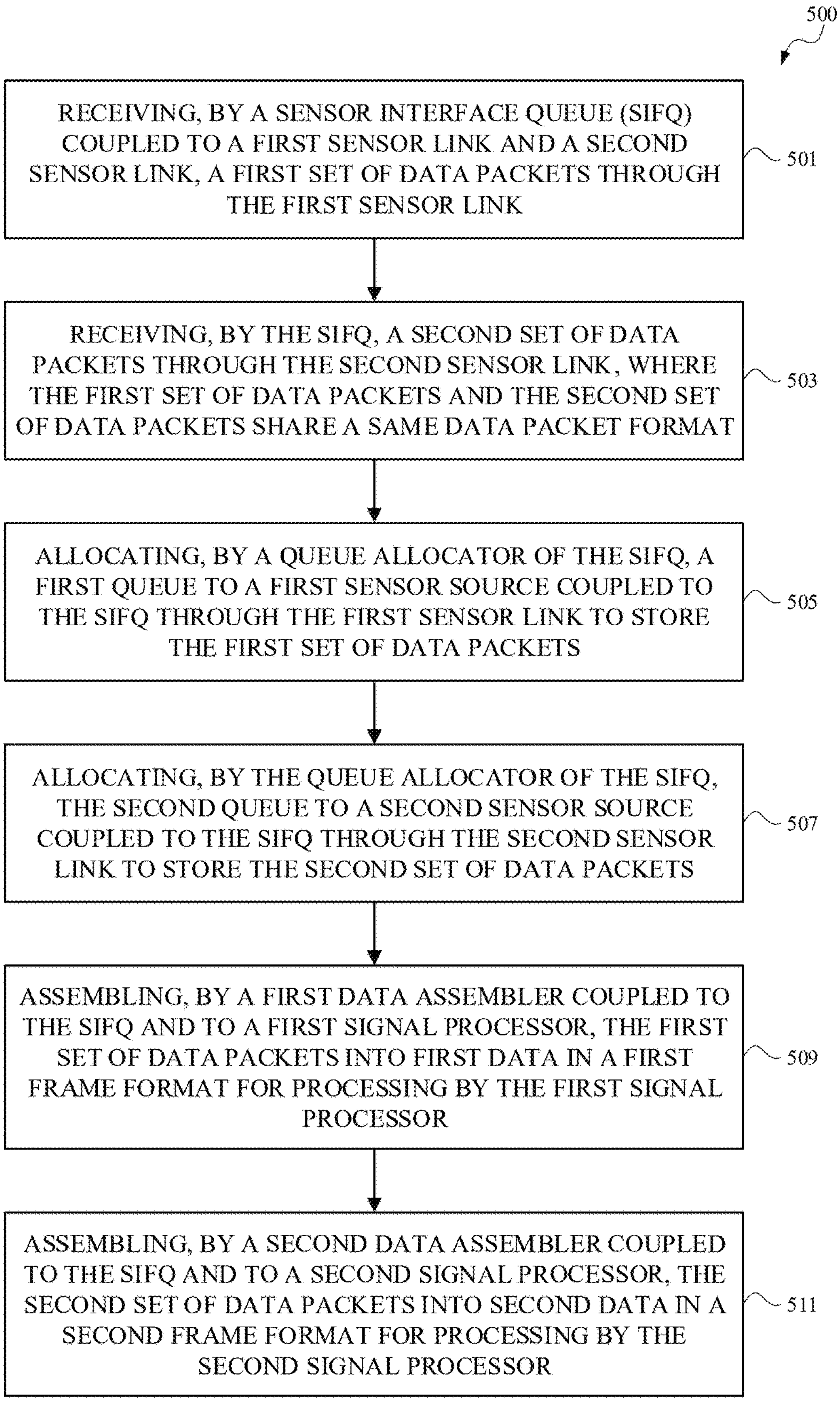
FIG. 5 illustrates a flowchart of process performed by a SIF system, according to some embodiments.

FIG. 5 illustrates a flowchart of process 500 performed by SIF system 400, according to some embodiments. Other representations of systems for performing operations by a SIF system are within the scope of the present disclosure. Also, additional operations can be performed between various operations of process 500 and can be omitted merely for clarity and ease of description. The additional operations can be provided before, during, and/or after process 500, in which one or more of these additional operations are briefly described herein. Moreover, not all operations are needed to perform the disclosure provided herein. Additionally, some of the operations can be performed simultaneously or in a different order than shown in FIG. 5. In some embodiments, one or more other operations can be performed in addition to or in place of the presently-described operations.

At operation 501, process 500 can include receiving, by SIFQ 401 coupled to sensor link 406*a* and sensor link 406*b*, a first set of data packets 414*a* through sensor link 406*a*.

At operation 503, process 500 can include receiving, by SIFQ 401, a second set of data packets 414*b* through sensor link 406*b*. In some embodiments, the first set of data packets 414*a* and the second set of data packets 414*b* can share the same data packet format.

At operation 505, process 500 can include allocating, by queue allocator 417 of SIFQ 401, queue 415*a* to sensor source 402*a* coupled to SIFQ 401 through sensor link 406*a* to store the first set of data packets 414*a*.

At operation 507, process 500 can include allocating, by queue allocator 417 of SIFQ 401, queue 415*b* to sensor source 402*b* coupled to SIFQ 401 through sensor link 406*b* to store the second set of data packets 414*b*.

At operation 509, process 500 can include assembling, by data assembler 405*a* coupled to SIFQ 401 and to ISP processor 407*a*, the first set of data packets 414*a* into first data 431*a* in a first frame format for processing by ISP processor 407*a*.

At operation 511, process 500 can include assembling, by data assembler 405*b* coupled to SIFQ 401 and to ISP processor 407*b*, the second set of data packets 414*b* into second data 431*b* in a second frame format for processing by ISP processor 407*b*.

Figure 6:
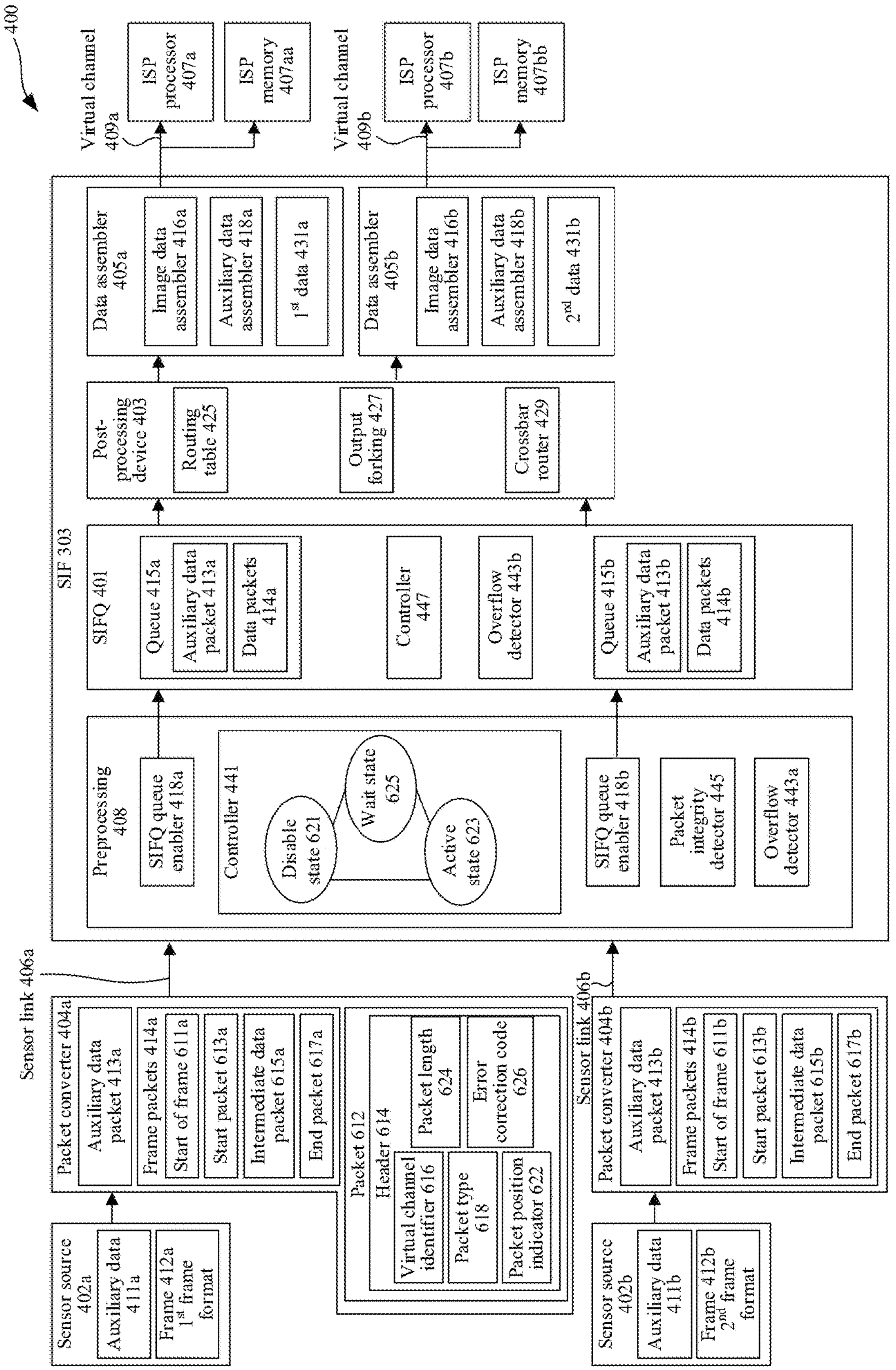
FIG. 6 is a block diagram illustrating a SIF system, according to some embodiments.

FIG. 6 is a block diagram illustrating additional details of SIF system 400, according to some embodiments. SIF system 400 can include SIF 303 with additional components and devices, with additional details provided herein.

In some embodiments, packet converter 404*a* can generate data packets 414*a* for frame 412*a* in the first frame format generated by sensor source 402*a*. Packet converter 404*b* can generate data packets 414*b* for frame 412*b* in the second frame format generated by sensor source 402*b*. In some embodiments, packet converter 404*a* can further generate auxiliary data packets 413*a* based on auxiliary data 411*a* generated by sensor source 402*a*, where auxiliary data packets 413*a* or auxiliary data 411*a* includes non-image related data.

In some embodiments, a data packet 612 can include a header 614 with a virtual channel identifier 616 corresponding to a virtual channel between a data assembler and a signal processor to process data packet 612. In some embodiments, header 614 can include a packet type 618 to indicate that the data packet is an auxiliary data packet for non-image related data or image related data. In some embodiments, header 614 can further include a packet position indicator 622 to indicate that packet 612 is a start packet of a frame, an end packet of the frame, or an intermediate packet of the frame, e.g., frame 412*a*. In some embodiments, frame 412*a* can be converted to a set of packets including a start packet 613*a* followed by one or more intermediate data packets 615*a* and an end packet 617*a* of frame 412*a*. In some embodiments, header 614 can further include a packet length parameter 624 to indicate a length of data packet 612. Furthermore, header 614 can include an error correction code 626 for data packet 612 to perform some error correction functions for data packet 612.

In addition, packet converter 404*a* can further generate a start of frame indicator 611*a* to indicate data packets for frame 412*a* will be generated after start of frame indicator 611*a*. In some embodiments, there can be an end of frame indicator as well. Similarly, frame 412*b* can be converted to a set of packets including a start packet 613*b* followed by one or more intermediate data packets 615*b* and an end packet 617*b* of frame 412*b*. In addition, packet converter 404*b* can further generate a start of frame indicator 611*b* to indicate data packets for frame 412*b* will be generated after start of frame indicator 611*b*.

In some embodiments, queue enabler 418*a* can be coupled to sensor link 406*a* and configured to enable SIFQ 401 to receive data packets 414*a* from sensor link 406*a*, where data packets 414*a* can be stored in queue 415*a* and are routed to data assembler 405*a* to be assembled into first data 431*a* in the first frame format for processing by ISP processor 407*a*. Similarly, queue enabler 418*b* can be coupled to sensor link 406*b* and configured to enable SIFQ 401 to receive data packets 414*b* from sensor link 406*b*, where data packets 414*b* can be stored in queue 415*b* and are routed to data assembler 405*b* to be assembled into second data 431*b* in the second frame format for processing by ISP processor 407*b*. In some embodiments, there can be a queue enabler for each queue of SIFQ 401. In some embodiments, queue enabler 418*a* is coupled to queue 415*a*, queue enabler 418*b* is coupled to queue 415*b*, . . . , and queue enabler 418*k* is coupled to queue 415*k*. In some embodiments, a queue enabler, such as queue enabler 418*a*, 418*b*, . . . , 418*k*, can include a multiplexer circuit configured to receive or stop receiving a data packet, where the multiplexer circuit can be controlled by controller 441 of preprocessing device 408.

In some embodiments, controller 441 is coupled to SIFQ 401, queue enabler 418*a*, queue enabler 418*b*, and other queue enabler circuits for each of the sensor sources. In some embodiments, controller 441 or SIFQ system 401 can be in various states, such as a disable state 621, an active state 623, or a wait state 625. Different operations can be performed by controller 441 in a different state, as described below. In some embodiments, controller 441 can be in less than 3 states or more than 3 states, or in 3 states other than disable state 621, active state 623, or wait state 625.

In some embodiments, controller 441 can detect an overflow in queue 415*a*. In response to the overflow, controller 441 can disable queue enabler 418*a* to stop receiving additional data packets from sensor link 406*a*, where the additional data packets can be generated by sensor source 402*a*. Afterwards, controller 441 can enter disabled state 621 for SIF system 400.

In some embodiments, to detect the overflow, controller 441 can receive a signal from SIFQ 401 indicating the overflow in queue 415*a*, which can be generated by overflow detector 443*b* of SIFQ 401. In some embodiments, controller 441 can receive a signal from overflow detector 443*a* of preprocessing device 408 indicating the overflow in queue 415*a*. In some embodiments, SIFQ 401 can generate the signal indicating the overflow in queue 415*a* in response to a detection that a speed of data packets arriving at queue 415*a* is higher than a speed of data packets leaving queue 415*a* to be routed to data assembler 405*a*. In some embodiments, SIFQ 401 can generate the signal indicating the overflow in queue 415*a* in response to a determination that the space available in queue 415*a* is lower than a predetermined space limit, such as when queue 415*a* is 90% full of the queue capacity or 100% full of the queue capacity.

In some embodiments, controller 441 can receive, in response to controller 441 or SIF system 400 being in disabled state 621, data packet 612 through sensor link 406*a*. In some embodiments, data packet 612 can arrive through sensor link 406*a* and trigger controller 441 to recognize that data packet 612 has arrived. In some embodiments, a buffer within preprocessing device 408 can store data packet 612 temporarily upon arrival of data packet 612. Afterwards, controller 441 can determine that data packet 612 is not start packet 613*a* of frame 412*a* and discard data packet 612. In some embodiments, controller 441 can determine that data packet 612 is not start packet 613*a* based on packet position indicator 622. By discarding data packet 612 when data packet 612 is not a start packet and controller is in disable state 621, controller 441 can prevent an out-of-order packet transmission.

In some embodiments, controller 441 can receive, in response to controller 441 or SIF system 400 being in disabled state 621, data packet 612 through sensor link 406*a*. Afterwards, controller 441 can determine that data packet 612 is start packet 613*a* and further enable queue enabler 418*a* to allow data packet 612 to be sent to queue 415*a* to be routed to data assembler 405*a*. In addition, controller 441 can enter active state 623 to receive one or more intermediate data packets 615*a* of frame 412*a* through sensor link 406*a*.

In some embodiments, controller 441 can receive, in response to controller 441 or SIF system 400 being in active state 623, data packet 612 through sensor link 406*a*. Afterwards, controller 441 can determine that data packet 612 is end packet 617*a* of frame 412*a* and further allow end packet 617*a* to be sent to queue 415*a* to be routed to data assembler 405*a*. Afterwards, controller 441 can enter wait state 625 to receive one or more additional data packets from sensor link 406*a*.

In some embodiments, controller 441 can receive, in response to controller 441 or SIF system 400 being in disabled state 621, a control signal to enable SIF system 400. Upon receiving the control signal, controller 441 can enable queue enabler 418*a* to allow data packet 612 received by preprocessing device 408 to be sent to queue 415*a* to be routed to data assembler 405*a*. Controller 441 can enter wait state 625 or active state 623 for preprocessing device 408 to monitor sensor link 406*a* for a start packet of a frame, where the frame is converted to a set of packets including the start packet followed by one or more intermediate data packets and an end packet of the frame. In some embodiments, operations of controller 441 can depend on start of frame indicator 611*a* in addition to start packet 613*a*.

Figure 7:
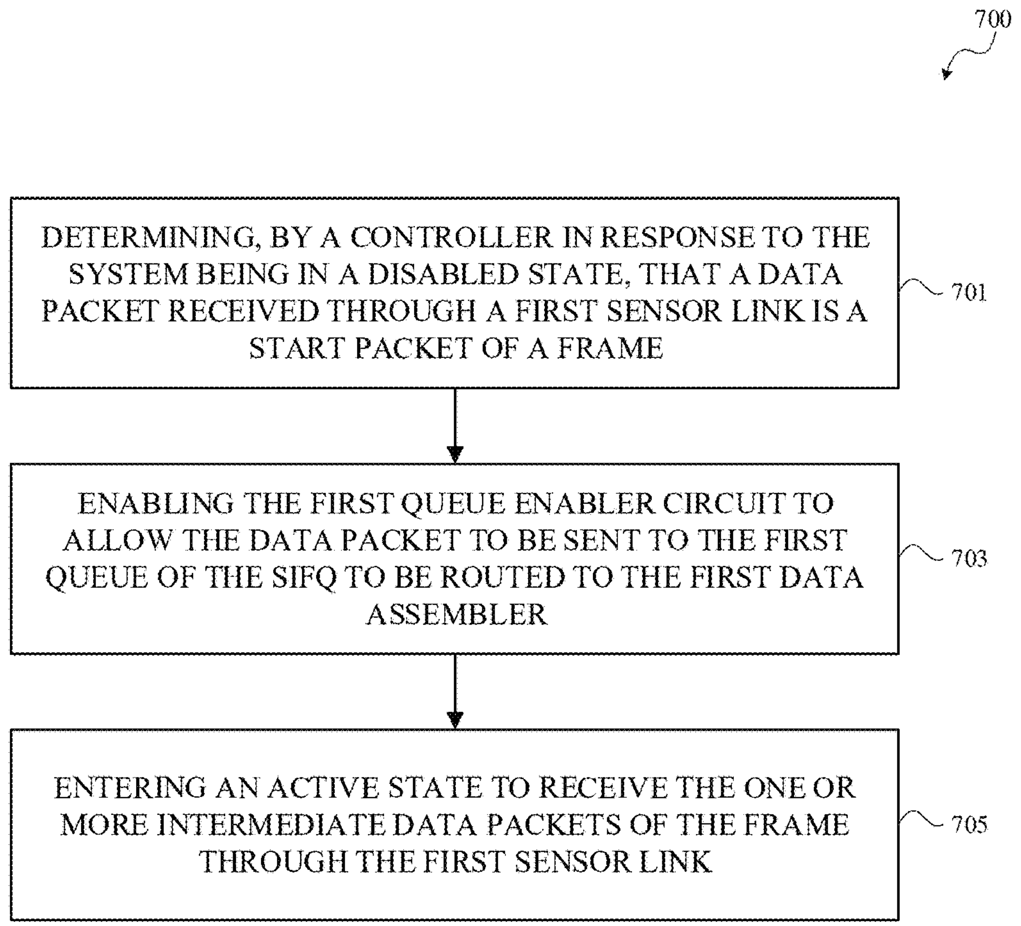
FIG. 7 illustrates a flowchart of process performed by a SIF system, according to some embodiments.

FIG. 7 illustrates a flowchart of process 700 performed by preprocessing device 408 of SIF system 400, according to some embodiments. Other representations of systems for performing operations by a SIF system are within the scope of the present disclosure. Also, additional operations can be performed between various operations of process 700 and can be omitted merely for clarity and case of description. The additional operations can be provided before, during, and/or after process 700, in which one or more of these additional operations are briefly described herein. Moreover, not all operations are needed to perform the disclosure provided herein. Additionally, some of the operations can be performed simultaneously or in a different order than shown in FIG. 7. In some embodiments, one or more other operations can be performed in addition to or in place of the presently-described operations.

At operation 701, process 700 can include determining, by controller 441 in response to SIF system 400 or controller 441 being in disabled state 621, that data packet 612 received through sensor link 406*a* is start packet 613*a* of frame 412*a*. In some embodiments, frame 412*a* is converted to a set of packets including start packet 613*a* followed by one or more intermediate data packets 615*a* and end packet 617*a*.

At operation 703, process 700 can include enabling queue enabler 418*a* to allow data packet 612 to be sent to queue 415*a* to be routed to data assembler 405*a*.

At operation 705, process 700 can include controller 441 entering active state 623 to receive the one or more intermediate data packets 615*a* through sensor link 406*a*.

Figure 8:
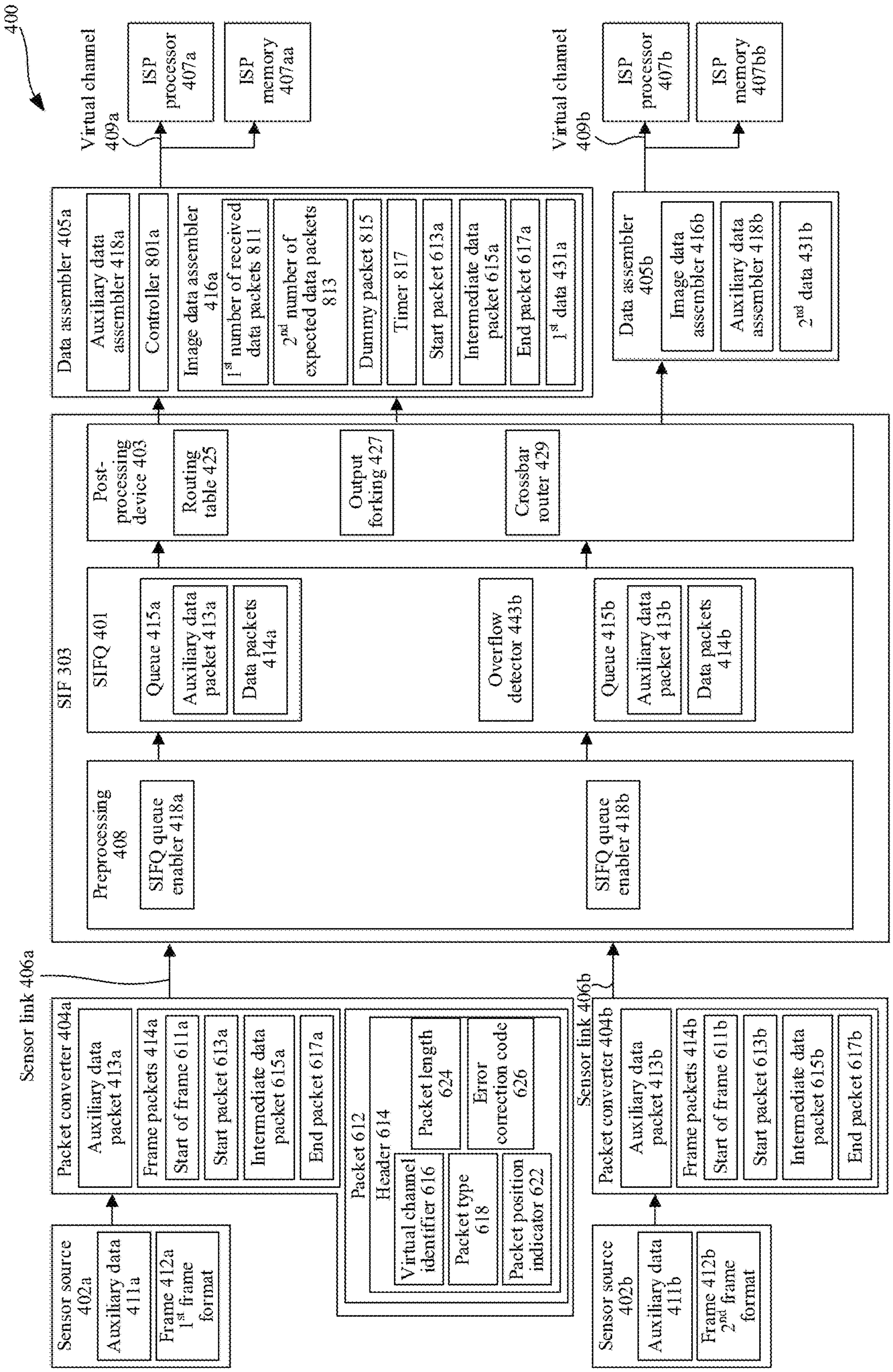
FIG. 8 is a block diagram illustrating a SIF system, according to some embodiments.

FIG. 8 is a block diagram illustrating additional details of SIF system 400, according to some embodiments. SIF system 400 can include SIF 303 with additional components and devices, with details provided herein in addition to the description above.

In some embodiments, packet converter 404*a* can generate data packets 414*a* for frame 412*a* in the first frame format generated by sensor source 402*a*, and packet converter 404*b* can generate data packets 414*b* for frame 412*b* in the second frame format generated by sensor source 402*b*. In some embodiments, packet converter 404*a* can further generate auxiliary data packets 413*a* based on auxiliary data 411*a* generated by sensor source 402*a*, where auxiliary data packets 413*a* or auxiliary data 411*a* includes non-image related data. In some embodiments, a data packet 612 can include a header 614 including a virtual channel identifier 616 corresponding to a virtual channel between a data assembler and a signal processor to process data packet 612. In some embodiments, header 614 can include a packet type 618 to indicate that the data packet is an auxiliary data packet for non-image related data or image related data. In some embodiments, header 614 can further include a packet position indicator 622 to indicate that packet 612 is a start packet of a frame, an end packet of the frame, or an intermediate packet of the frame, e.g., frame 412*a*. In some embodiments, frame 412*a* can be converted to a set of packets including a start packet 613*a* followed by one or more intermediate data packets 615*a* and an end packet 617*a* of frame 412*a*. In some embodiments, header 614 can further include a packet length parameter 624 to indicate a length of data packet 612. Furthermore, header 614 can include an error correction code 626 for data packet 612 to perform some error correction functions for data packet 612.

In some embodiments, queue enabler 418*a* can be coupled to sensor link 406*a* and configured to enable SIFQ 401 to receive data packets 414*a* from sensor link 406*a*, where data packets 414*a* can be stored in queue 415*a* and are routed to data assembler 405*a* to be assembled into first data 431*a* in the first frame format for processing by ISP processor 407*a*. Similarly, queue enabler 418*b* can be coupled to sensor link 406*b* and configured to enable SIFQ 401 to receive data packets 414*b* from sensor link 406*b*, where data packets 414*b* can be stored in queue 415*b* and are routed to data assembler 405*b* to be assembled into first data 431*b* in the second frame format for processing by ISP processor 407*b*.

In some embodiments, data assembler 405*a* can include image data assembler 416*a*, auxiliary data assembler 418*a*, controller 801*a*, and any other additional components to perform functions to assemble data packets into frames, and further detect any errors in the process. In some embodiments, controller 801*a* can implement, control, or coordinate functions of image data assembler 416*a*, auxiliary data assembler 418*a*. In some embodiments, image data assembler 416*a* can be configured to assemble data packets 414*a* into first data 431*a* in the first frame format for processing by ISP processor 407*a* and detect an error related to assembling first data 431*a*. Similarly, data assembler 405*b* can include image data assembler 416*b*, auxiliary data assembler 418*b*, controller 801*b*, and any other additional components, where image data assembler 416*b* can assemble data packets 414*b* into second data 431*b* for processing by ISP processor 407*b*.

In some embodiments, to detect the error related to assembling first data 431*a*, data assembler 405*a* can determine a difference between a first number of data packets 811 received from queue 415*a* and a second number of data packets 813 expected to be received from queue 415*a* based on the first frame format for first data 431*a*. In response to a determination that the first number of data packets 811 is smaller than the second number of data packets 813, data assembler 405*a* can generate one or more dummy packets 815 of a dummy frame to increase the first number of data packets 811 received from queue 415*a* to equal to the second number of data packets 813 expected to be received from queue 415*a*. In some embodiments, one or more dummy packets 815 can be placed at an end of first data 431*a* after first data 431*a* has been assembled.

In some embodiments, to detect the error related to assembling first data 431*a*, data assembler 405*a* can determine that a predetermined time period has expired before receiving start packet 613*a* of frame 412*a*. Data assembler 405*a* can determine that a predetermined time period has expired based on a time measured by a timer 817. In some embodiments, to detect the error related to assembling first data 431*a*, data assembler 405*a* can determine that a predetermined time period has expired before receiving an end packet of a frame.

In some embodiments, to detect the error related to assembling first data 431*a*, data assembler 405*a* can determine that a data packet of a frame is received before receiving the start packet of the frame. Such an error would indicate the transmission of data packets from queue 415*a* to data assembler 405*a* is out of order.

In some embodiments, to detect the error related to assembling first data 431*a*, data assembler 405*a* can determine that a length of a received data packet does not equal to a packet length indicated by a header of the data packet.

In some embodiments, to detect the error related to assembling first data 431*a*, data assembler 405*a* can determine that the error is based on an error correction coding mechanism.

Figure 9:
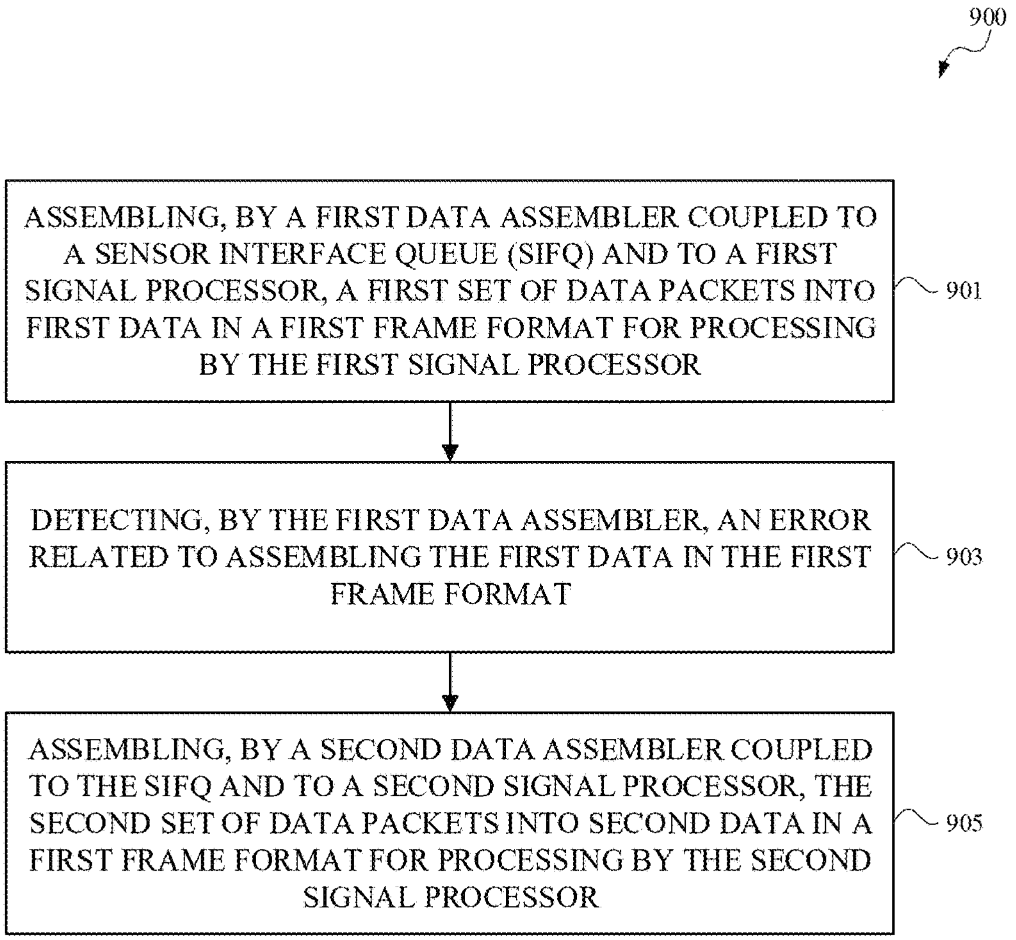
FIG. 9 illustrates a flowchart of process performed by a SIF system, according to some embodiments.

FIG. 9 illustrates a flowchart of process 900 performed by data assemblers of SIF system 400, according to some embodiments. Other representations of systems for performing operations by a SIF system are within the scope of the present disclosure. Also, additional operations can be performed between various operations of process 900 and can be omitted merely for clarity and ease of description. The additional operations can be provided before, during, and/or after process 900, in which one or more of these additional operations are briefly described herein. Moreover, not all operations are needed to perform the disclosure provided herein. Additionally, some of the operations can be performed simultaneously or in a different order than shown in FIG. 9. In some embodiments, one or more other operations can be performed in addition to or in place of the presently-described operations.

At operation 901, process 900 can include assembling, by data assembler 405*a* that is coupled to SIFQ 401 and to ISP processor 407*a*, data packets 414*a* into first data 431*a* in a first frame format for processing ISP processor 407*a*.

At operation 903, process 900 can include detecting, by data assembler 405*a*, an error related to assembling first data 431*a* in the first frame format.

At operation 905, process 900 can include assembling, by data assembler 405*b* coupled to SIFQ 401 and to ISP processor 407*b*, data packets 414*b* into second data 431*b* in the second frame format for processing by ISP processor 407*b*.

Figure 10:
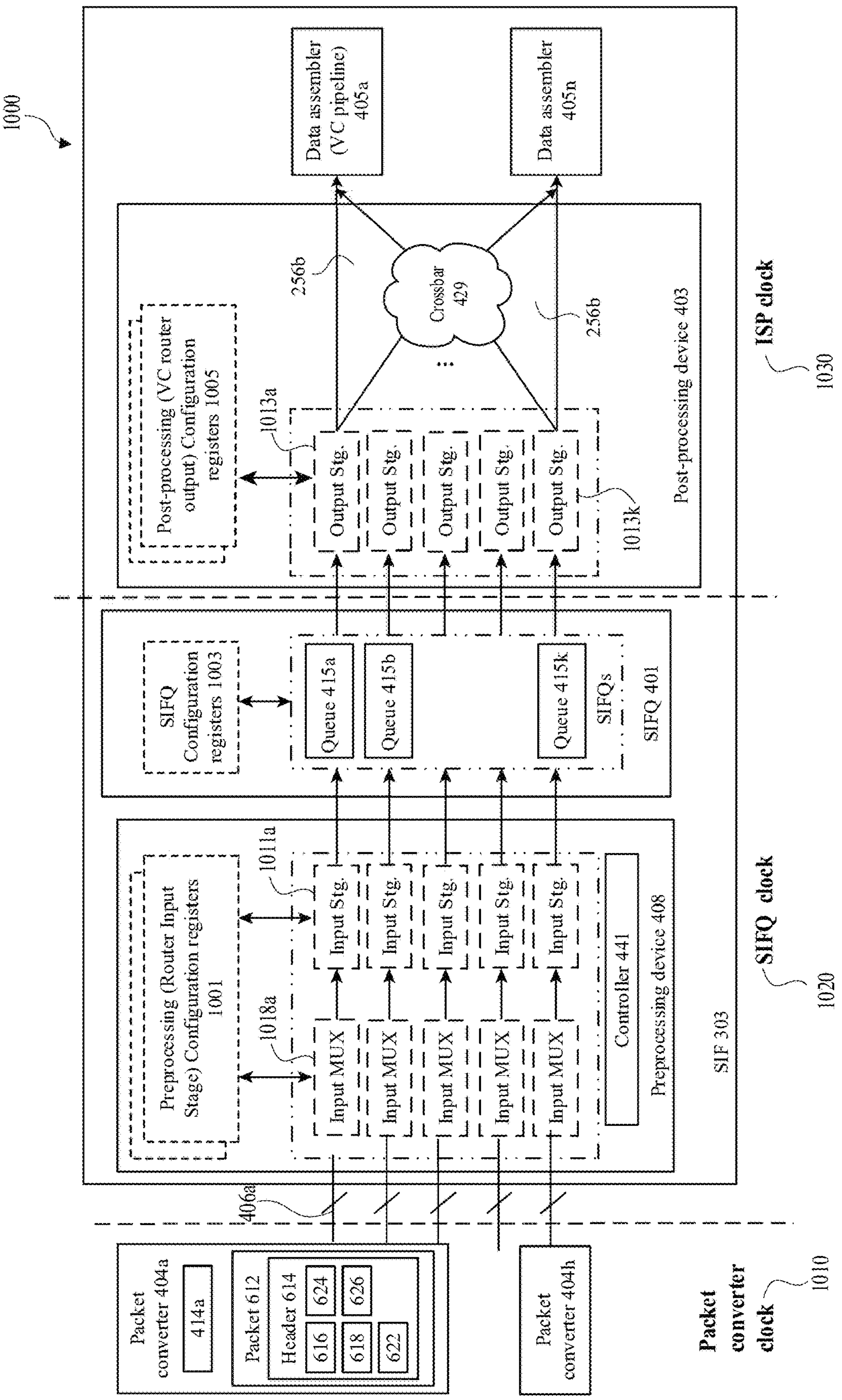
FIG. 10 is a block diagram illustrating a SIF system including a preprocessing device, a SIF queue (SIFQ), a post-processing device, and one or more data assemblers, according to some embodiments.

FIG. 10 is a block diagram illustrating a SIF system 1000 including a preprocessing device, a SIF queue (SIFQ), a post-processing device, and one or more data assemblers, according to some embodiments. In some embodiments, SIF system 1000 can be an implementation of SIF system 400. SIF system 1000 can include a subsystem 1010 operated based on a clock for packet converter 404*a*, . . . , packet converter 404*h*; a subsystem 1020 operated based on a SIFQ clock; and a subsystem 1030 operated based on an ISP clock for ISP processors 407*a*, . . . , 407*n*. Subsystem 1010 is an implementation of subsystem 410, subsystem 1020 is an implementation of subsystem 420, and subsystem 1030 is an implementation of subsystem 430.

In some embodiments, packet converter 404*a* coupled to sensor source 402*a* can generate a set of data packets 414*a* including data packet 612 for frame 412*a* generated by sensor source 402*a*. In some embodiments, data packet 612 can include a header 614 including a virtual channel identifier 616 corresponding to a virtual channel between a data assembler and a signal processor to process data packet 612. In some embodiments, header 614 can include a packet type 618 to indicate that the data packet is an auxiliary data packet for non-image related data or image related data. In some embodiments, header 614 can further include a packet position indicator 622 to indicate that packet 612 is a start packet of a frame, an end packet of the frame, or an intermediate packet of the frame. In some embodiments, frame 412*a* can be converted to a set of packets including a start packet 613*a* followed by one or more intermediate data packets 615*a* and an end packet 617*a* of frame 412*a*. In some embodiments, header 614 can further include a packet length parameter 624 to indicate a length of data packet 612. Furthermore, header 614 can include an error correction code 626 for data packet 612 to perform some error correction functions for data packet 612.

In some embodiments, header 614 can include various fields and parameters as indicated in the following table. In some embodiments, the values shown in the following table are exemplary, and other numbers or values higher or lower than those shown in the table can be used based on system design and requirements.

| Header Symbol | Bits | Header Field | Field Information |
|---|---|---|---|
| 0 | 6:0 | Virtual Channel ID | Up to 126 virtual channels. Virtual Channel (VC) identifier (ID) 126 & 127 are RESERVED. |
| | 7 | CRC Flag | Flag for optional cyclic redundancy check (CRC). CRC16 Link Symbol is attached to the end of the packet if set to 1. |
| | 15:8 | Packet Type | Indicator of packet type |
| | 31:16 | Packet Header Data | Data associated to packet type |
| 1 | 15:0 | Payload Length | Up to 65525 Link Symbols |
| | 25:16 | Reserved | Set to 0 |
| | 30:26 | Number of Valid Bits | Number of valid bits in the last payload data symbol. 0 means 1 bit in the last symbol, 31 means 32 valid bits. |
| | 31 | Flag for Number of Valid Bits | To indicate whether the use the number of valid bits in decoding. |

In some embodiments, SIF 303 can include preprocessing device 408 and post-processing device 403 coupled to SIFQ 401. In some embodiments, preprocessing device 408 can include a number of queue enablers, one queue enabler for each queue of SIFQ 401. In some embodiments, a queue enabler can be implemented by a multiplexer circuit. Multiplexer circuit 1018*a* is a queue enabler coupled to queue 415*a* and can be controlled by controller 441. When multiplexer circuit 1018*a* is enabled, data packet 612 can enter a buffer storage 1011*a* to be received by queue 415*a*.

In some embodiments, preprocessing device 408 can include configuration registers 1001 to store the configuration parameters for preprocessing device 408, which may include a capacity of buffer storage 1011*a*, a capacity of queue 415*a*, and other parameters. In some embodiments, SIFQ 401 can include configuration registers 1003 to store the configuration parameters for SIFQ 401, which may include a capacity of queue 415*a*, a parameter for queue allocation to a sensor source, and other parameters. In some embodiments, and post-processing device 403 can include configuration registers 1005 to store the configuration parameters for post-processing device 403, which may include a routing parameter for routing data packet 612 to a destination data assembler, and other parameters.

In some embodiments, post-processing device 403 can include a buffer storage 1013*a* coupled to queue 415*a* to store data packets received from queue 415*a*, and a buffer storage 1013*k* coupled to queue 415*k* to store data packets received from queue 415*k*, where a buffer storage is coupled to a queue. In some embodiments, post-processing device 403 can include a crossbar router 429 that is coupled to all the data assemblers, e.g., data assembler 405*a*, . . . , data assembler 405*n*. In some embodiments, post-processing device 403 can be referred to as a "virtual channel (VC) router output stage." In some embodiments, preprocessing device 408 can be referred to as a "VC router input stage" or a "router input stage." In some embodiments, a data assembler can be referred to as a "VC pipeline" as well since the data assembler generates frame data for the ISP pipeline processing.

Figure 11:
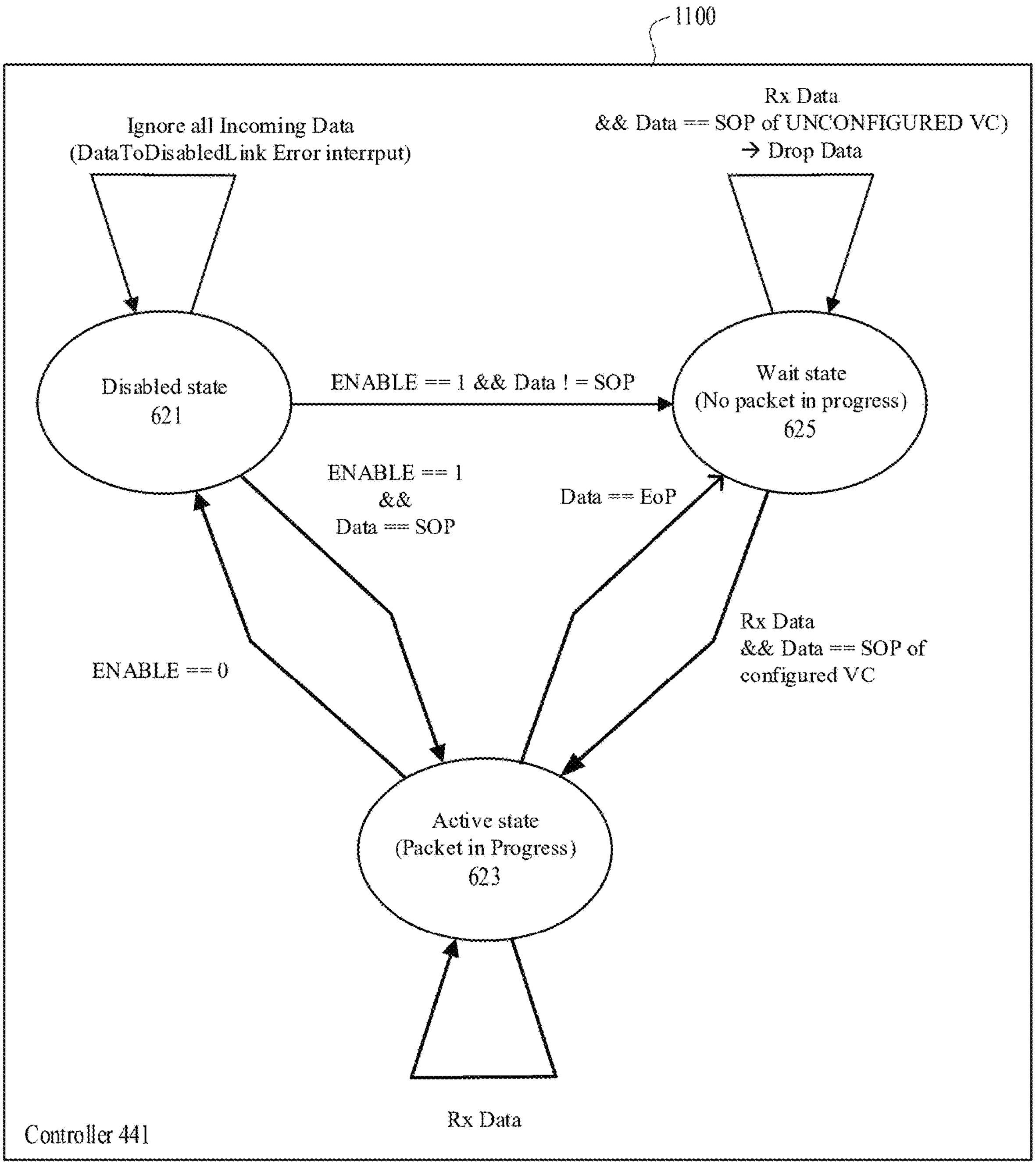
FIG. 11 is a state diagram illustrating operations performed by a preprocessing device of a SIF system, according to some embodiments.

FIG. 11 is a state diagram 1100 illustrating operations performed by preprocessing device 408 of SIF system 400, according to some embodiments. State diagram 1100 can include disabled state 621, wait state 625, and active state 623, similar to the states as shown in FIG. 6 for controller 441 of preprocessing device 408. In some embodiments, controller 441 can perform operations related to detecting and handling SIFQ overflow related errors and ensuring data packet integrity as they are pushed into the queues of SIFQ 401. In some embodiments, packet integrity can refer to retaining the start packet and the end packet for a frame so that the frame is assembled in order and separated from other frames. In some embodiments, packet integrity determination can be further based on start of frame indicator 611*a*.

In some embodiments, at disabled state 621, controller 441 can ignore incoming data packets and stay in disabled state 621 unless an enable signal is enabled. When the enable signal is enabled (ENABLE=1), and a received data packet is a start packet (SOP), controller 441 can move to active state 623. When the enable signal is enabled (ENABLE=1), and a received data packet is not a start packet (SOP), controller 441 can move to wait state 625.

In some embodiments, at active state 623, controller 441 can continue to receive data packets and remain at active state when the received data packet is not an end packet. Accordingly, the received data packets are intermediate data packets. When the received data packet is an end data packet (EoP) and controller 441 is in active state 623, controller 441 can receive the end data packet and transmit to wait state 625. When controller 441 is in active state and receives a signal to indicate the enable signal is disabled (ENABLE=0), controller 441 can transmit to disabled state 621.

In some embodiments, at wait state 625, when a received data packet is a start packet of an un-configured virtual channel, controller 441 can determine to drop the received data packet while staying in wait state 625. When the received data packet is a start packet of a configured virtual channel, controller 441 can transmit to active state 623 to continue to receive intermediate data packets. In some embodiments, an error signal can cause the enable signal to be of disabled (ENABLE=0) value, and controller 441 can transmit to disabled state 621. In some embodiments, an error signal can be generated when an overflow is detected, e.g., by overflow detector 443*a* or overflow detector 443*b*, an error for data being transmitted in a disabled link, or the data packet is for an un-configured virtual channel.

Figure 12:
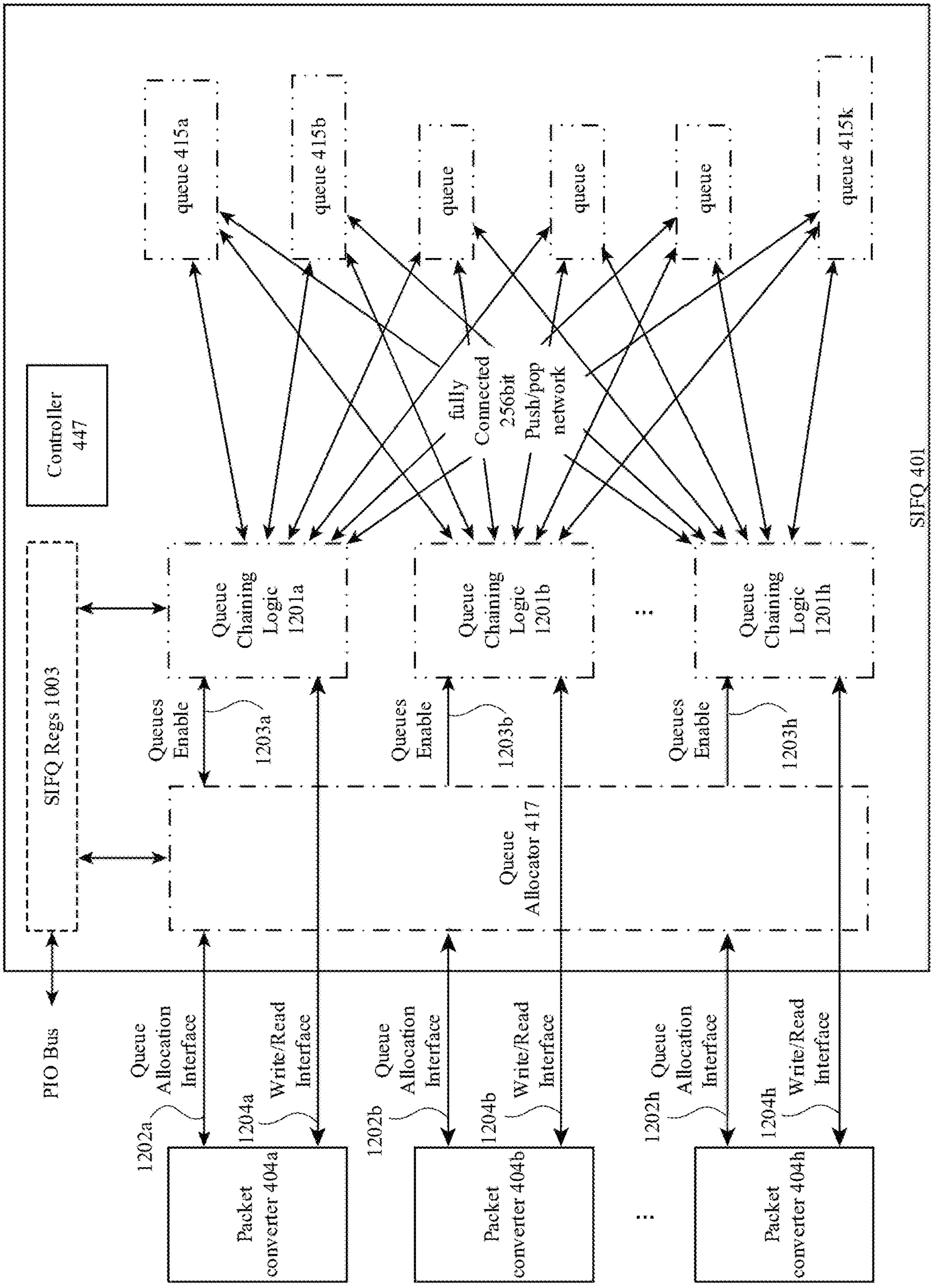
FIG. 12 is a block diagram illustrating a SIFQ of a SIF system, according to some embodiments.

FIG. 12 is a block diagram illustrating an implementation of SIFQ 401 of a SIF system, according to some embodiments. SIFQ 401 can include queue 415*a*, queue 415*b*, . . . , queue 415*k*, which are connected to the h sensor sources through the h packet converters 404*a*, 404*b*, . . . , 404*h*. In some embodiments, the h packet converters 404*a*, 404*b*, . . . , 404*h* are coupled to queue allocator 417, each packet converter being coupled to queue allocator 417 through a queue allocation interface and a write/read interface. In some embodiments, the write/read interface can have 256 bits bandwidth. Furthermore, for each packet converter, queue allocator 417 is coupled to a queue chaining logic through a queue enable signal, and the write/read interface can be further coupled to the queue chaining logic. Accordingly, packet converter 404*a* can be coupled to queue allocator 417 through queue allocation interface 1202*a* and write/read interface 1204*a*. In addition, write/read interface 1204*a* can be coupled to queue chaining logic 1201*a*, while queue allocator 417 can send a queue enable signal 1203*a* to queue chaining logic 1201*a*. Similarly, packet converter 404*b* can be coupled to queue allocator 417 through queue allocation interface 1202*b* and write/read interface 1204*b*. In addition, write/read interface 1204*b* can be coupled to queue chaining logic 1201*b*, while queue allocator 417 can send a queue enable signal 1203*b* to queue chaining logic 1201*b*. In addition, packet converter 404*h* can be coupled to queue allocator 417 through queue allocation interface 1202*h* and write/read interface 1204*h*. In addition, write/read interface 1204*h* can be coupled to queue chaining logic 1201*h*, while queue allocator 417 can send a queue enable signal 1203*h* to queue chaining logic 1201*h*. Furthermore, queue chaining logic 1201*a*, queue chaining logic 1201*b*, . . . , queue chaining logic 1201*h* can be connected to queue 415*a*, queue 415*b*, . . . , queue 415*k*, so that a data packet generated by any packet converter can be transmitted to a queue based on the header information of the data packet.

In some embodiments, queue 415*a*, queue 415*b*, . . . , queue 415*k* can provide a shared pool of queues that are shared by all the h sensor sources. In some embodiments, each queue can have a size of 32 KB and support concurrent 256 bit write and read per cycle. At a time instance, each queue is only allocated to one sensor source or packet converter, according to some embodiments.

In some embodiments, SIFQ 401 can include various SIQ registers 1003, which can include queue count registers, queue allocation registers, and other registers. The queue count register can indicate how many queues a sensor source has allocated. Based on the content of the queue count register, controller 447 can allocate a number of queues to a sensor source upon request by the sensor source and further deallocate the number of queues when the sensor source indicates the queues are no longer needed.

In some embodiments, SIFQ 401 can receive data packets from sensor sources through the write/read interface. Each packet converter is coupled to queue allocator 417 through a dedicated write and read interface. Writes are driven by the sensor source or the corresponding packet converter. When a sensor source has data to push to the queues of SIFQ 401, the packet converter corresponding to the sensor source can request access to one or more queues of SIFQ 401. Reads are driven by the queues of SIFQ 401. When a queue of SIFQ 401 has valid data to push back to the sensor source, SIFQ 401 can send a request to the sensor source to control the operations of the sensor source. A sensor source, a corresponding packet converter, or preprocessing device 408 can monitor the capacity of a queue and determine how much space in the queue remains to accept data packets. With the monitoring capability, which can be performed by overflow detector 443*a* or overflow detector 443*b*, a packet converter or a sensor source would not push or write data into a queue when the queue is full.

In some embodiments, queue allocator 417 can maintain the allocation state of all queues of SIFQ 401. Queue allocator 417 can receive queue requests from a packet converter and respond by indicating to the packet converter which queues are allocated to the packet converter. In some embodiments, when SIFQ 401 has been started or out of power-on reset, no queue is allocated to any packet converter or a sensor source. A sensor source can request queues after receiving a start of a frame (SOF) indicator. Since a number of sensor sources can request queues at the same time, there can be a delay until queue allocator 417 responds to a sensor source. In some embodiments, there can be a predetermined time limit on the delay for the response to a request from a sensor source.

In some embodiments, there can be insufficient queues of SIFQ 401 available for allocation to the sensor sources. Such allocation errors can happen when too many queues of SIFQ 401 are allocated to one sensor source, there are too many active sensor sources requesting queues at the same time, or a sensor source remains active for longer than expected.

In some embodiments, queue allocator 417 can arbitrate between requesting sensor sources in a round-robin manner, ensuring there is a maximum delay until a sensor source receives a response to the queue request. In some embodiments, the allocation of queues of SIFQ 401 might not be fair, depending on when queues are released. For example, assume sensor source A and sensor source B both request 10 queues and sensor source A makes its request one cycle before sensor source B. Furthermore, assume only 5 queues are available when sensor source A's request arrives, but 15 are released by sensor source C one cycle later. In this scenario it is possible that sensor source A will be allocated only 5 queues (and receive an allocation error) and sensor source B will receive all 10 queues being requested. In some embodiments, queue allocator 417 does not achieve an optimal allocation of queues in this type of scenario.

Figure 13:
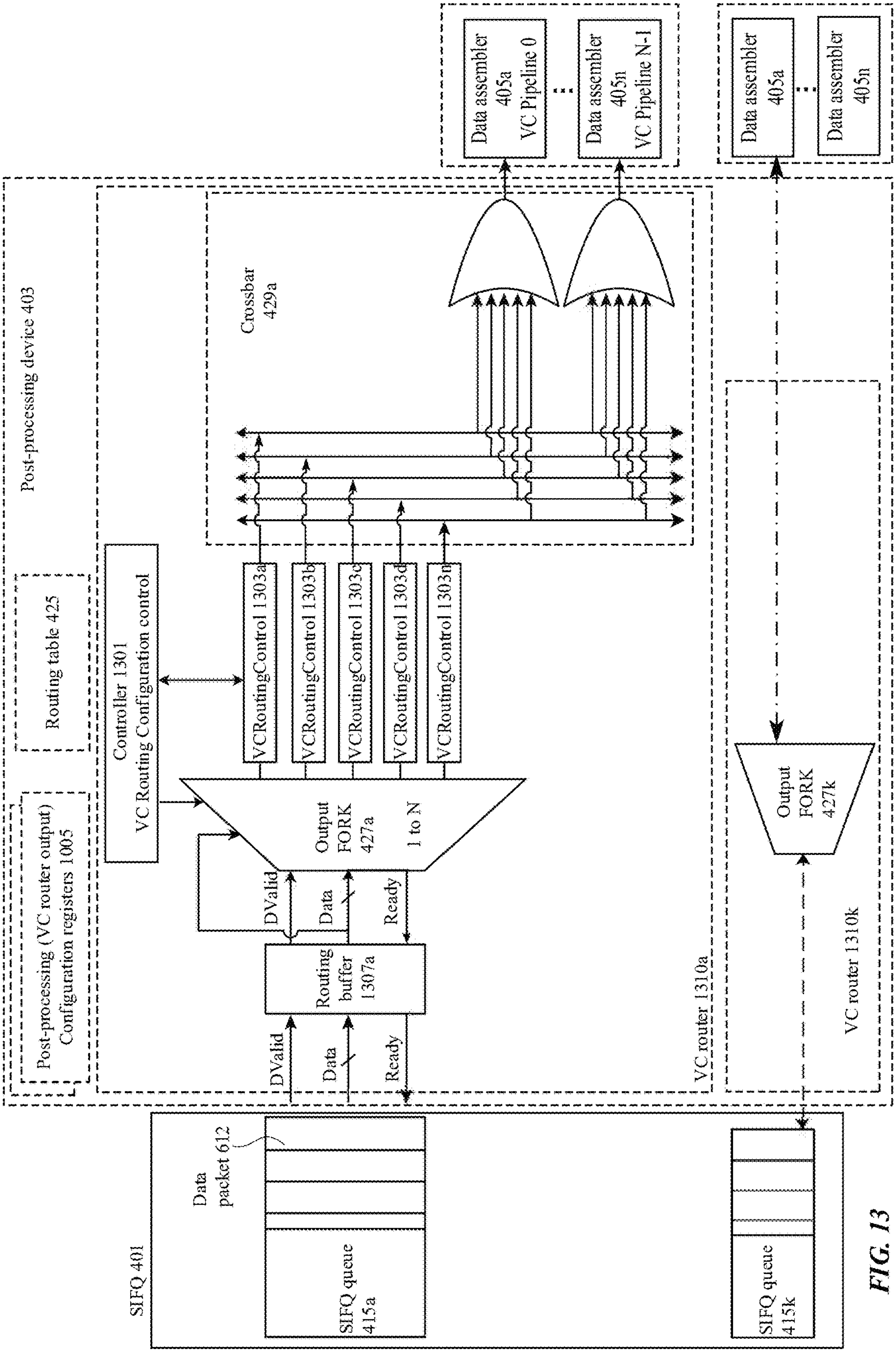
FIG. 13 is a block diagram illustrating a post-processing device of a SIF system, according to some embodiments.

FIG. 13 is a block diagram illustrating post-processing device 403 of SIF system 400, according to some embodiments. In some embodiments, post-processing device 403 can be viewed as the VC router output stage that includes the output stage of one or more VC routers. In some embodiments, the VC router output stage can route incoming data packets received from one or more queues of SIFQ 401 to their respective data assemblers and ISP processors. Post-processing device 403 can include output fork device 427*a*, . . . , output fork device 427*k*, corresponding to the number of queues including queue 415*a*, . . . , 415*k* of SIFQ 401. In some embodiments, one or more queues of SIFQ 401 can share an output fork device.

In some embodiments, an output fork device of post-processing device 403 can be connected to all downstream data assemblers, e.g., data assembler 405*a*, . . . data assembler 405*n*, through a physical crossbar, e.g., crossbar 429 or a component crossbar 429*a* corresponding to one queue 415*a*. In some embodiments, an output fork device, e.g., output fork device 427*a*, crossbar 429*a*, and other related circuits including routing buffer 1307*a*, and various VC routing control 1303*a*, 1303*b*, . . . , 1303*n*, can be collectively referred as "VC router 1310*a*." VC router 1310*a* can be coupled to queue 415*a* and all data assemblers, according to some embodiments. Operations of VC router 1310*a* can be controlled by controller 1301. Similarly, for each queue, such as queue 415*k*, a corresponding VC router 1310*k* can couple queue 415*k* to all data assemblers, according to some embodiments.

In some embodiments, post-processing device 403 can pop or accept data packet 612 from queue 415*a* of SIFQ 401, match data packet 612 to its associated data assembler and send data packet 612 forward. Output fork device 427*a* can include a one-to-N de-multiplexer circuit to transmit data packet 612 into one of the n data assemblers coupled to output fork device 427*a*. The associated data assembler can then decide whether to accept data packet 612 or not, based on the state of the associated data assembler and the content of data packet 612.

In some embodiments, queue 415*a* can be coupled to routing buffer 1307*a*, where routing buffer 1307*a* can store data packet 612 received from queue 415*a*. When a signal (DValid) indicates data packet 612 is a valid data packet, and a signal (Ready) indicates output fork device 427*a* is ready to accept data packets, data packet 612 can be sent through output fork device 427*a* and routed through VC routing control 1303*a*, 1303*b*, 1303*n* to the corresponding data assembler. Controller 1301 can control VC routing control 1303*a*, 1303*b*, . . . , 1303*n* so that only one of them is active to route data packet 612 to the associated data assembler. In some embodiments, post-processing device 403 can have routing table 425 to decide how data packet 612 will be routed. In some embodiments, there can be two separate routing tables for the different user cases when there is security protection provided in routing data packet 612.

In some embodiments, post-processing device 403 can be configured only when the associated sensor link is at an idle state so that no data packet is expected from the sensor source, no pending data in SIFQ 401, and all corresponding data assemblers are in idle state as well. In some embodiments, a single data assembler can be assigned to a single output forking device coupled to a queue at any time instance. In some embodiments, multiple virtual channels can be assigned to the same data assembler.

Figure 14:
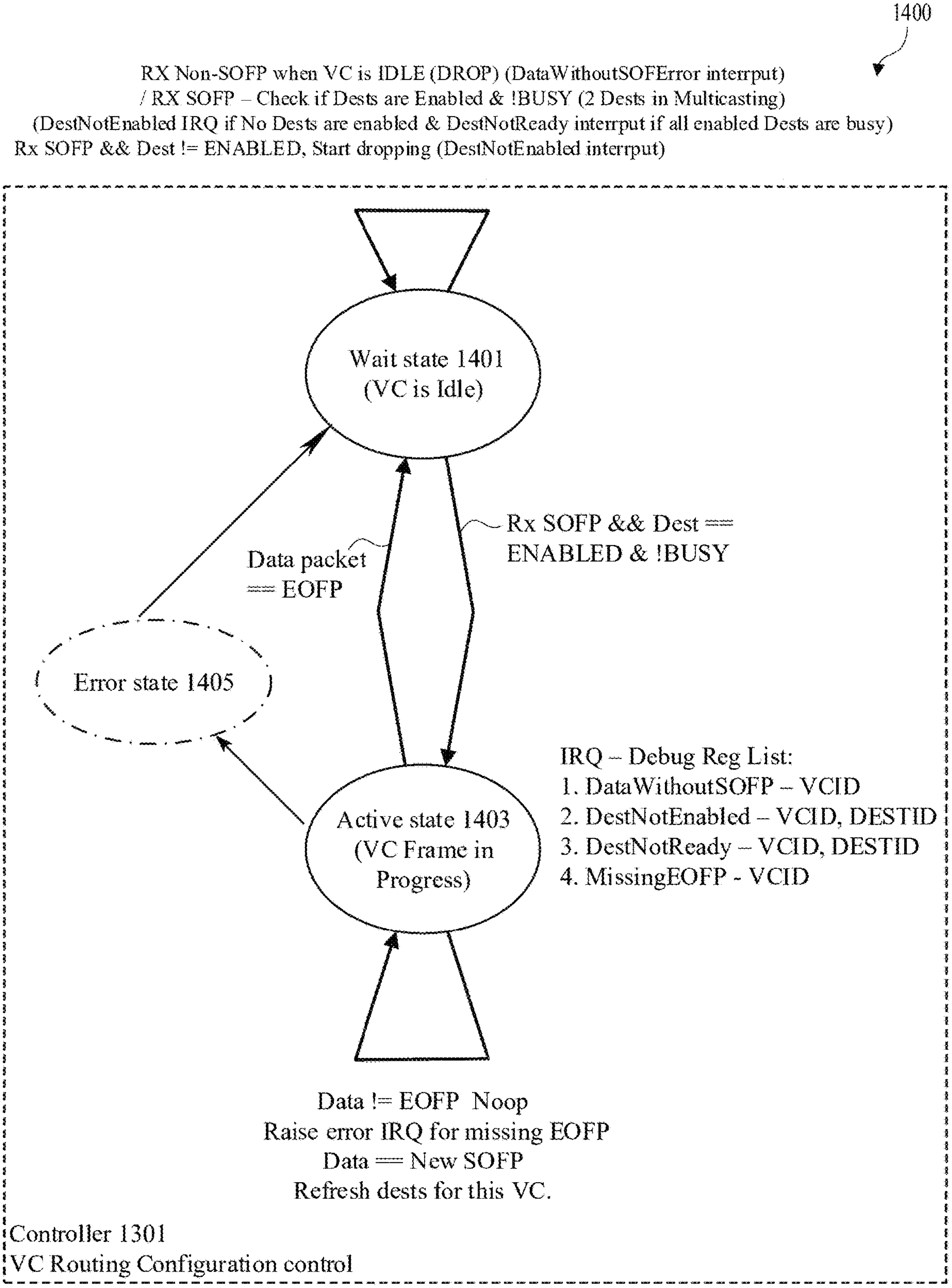
FIG. 14 is a state diagram illustrating operations performed by a post-processing device of a SIF system, according to some embodiments.

FIG. 14 is a state diagram 1400 illustrating operations performed by controller 1301 of post-processing device 403 or the VC router output stage of a SIF system, according to some embodiments. In some embodiments, state diagram 1400 can include a wait state 1401 and an active state 1403. In some embodiments, state diagram 1400 can further include an error state 1405, or a start state (not shown). There can be other form of state diagram for operations performed by controller 1301.

In some embodiments, controller 1301 of post-processing device 403 can be in a wait state 1401. When a received data packet is not the start packet of a frame and the virtual channel for the data packet is idle, the received data packet is dropped, since an error "data without a start packet of a frame" has occurred. In addition, when the received data packet is a start packet, controller 1301 can check the destination data assembler for the data packet is enabled or not, and is busy or not. If the destination data assembler is not enabled or is enabled and busy, an error has occurred and the data packet is dropped. Furthermore, when the received data packet is a start packet, the destination data assembler is enabled and not busy, controller 1301 can move to active state 1403. When the data packet is a multicast data packet, controller 1301 can perform the above-described operations for more than one destination data assembler.

In some embodiments, controller 1301 can be in active state 1403 and continue to receive intermediate data packets. When an end packet of a frame is received and controller is in active state 1403, controller 1403 can move to wait state 1401 after receiving the end packet. When a new start packet of a frame is received, controller 1301 can refresh the destination and its associated VC according to the new start packet. When an expected end packet of the frame is not received, controller 1301 can enter an error state 1405. In some embodiments, controller 1301 can stay in wait state 1401 when an error is detected but no error state is implemented. In some embodiments, there can be various errors, including data without a start packet of the frame, destination data assembler is not enabled, destination data assembler is not ready, missing end packet of the frame, and others.

Figure 15:
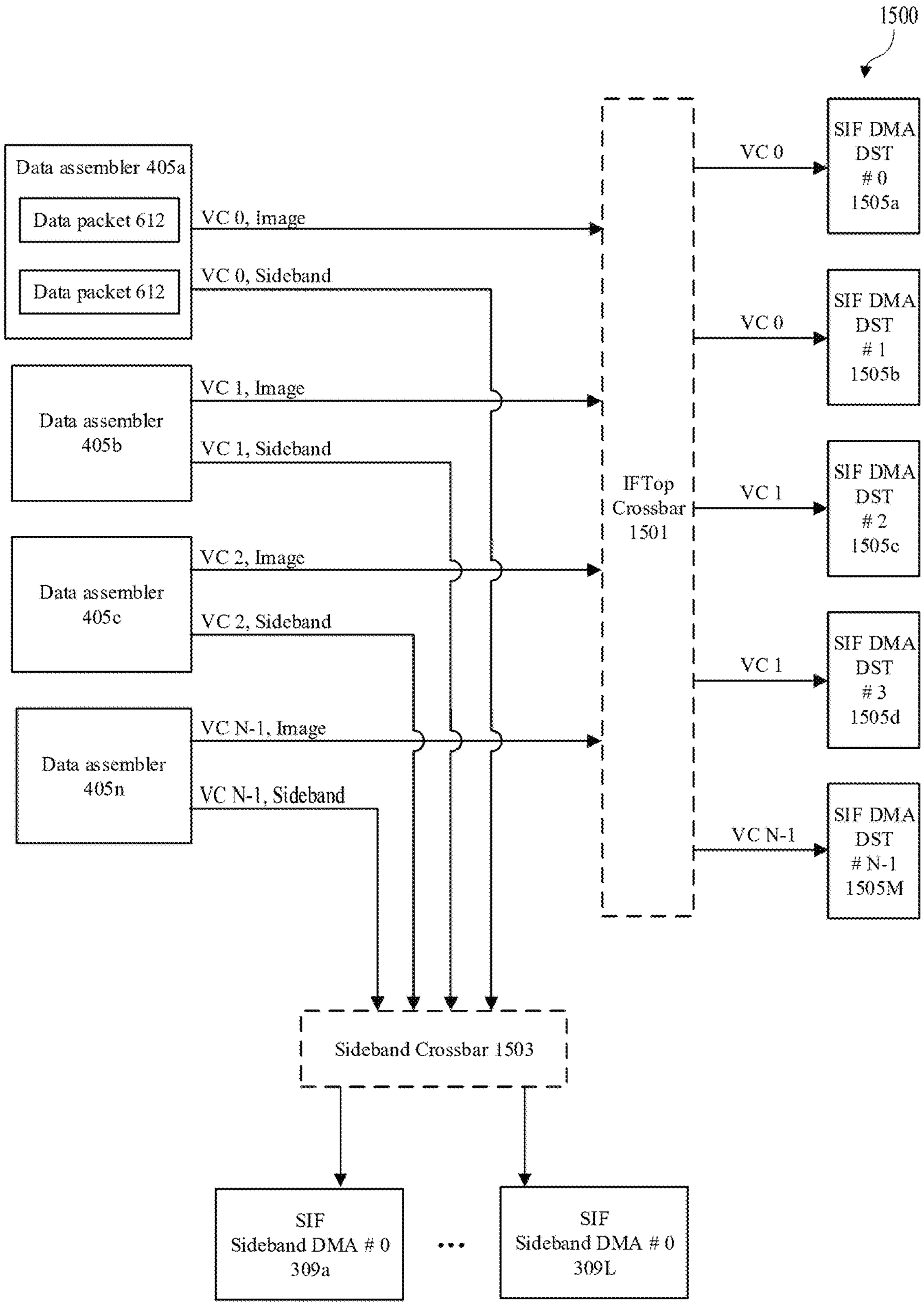
FIG. 15 is a block diagram illustrating data assemblers coupled to one or more image signal processors and sideband memory storage, according to some embodiments.

FIG. 15 is a block diagram 1500 illustrating data assemblers coupled to one or more image signal processors and sideband memory storage, according to some embodiments. In some embodiments, block diagram 1500 can implement the connections between data assemblers 405*a*, 405*b*, . . . , 405*n* with auxiliary data storage 309, and the various ISP processors and ISP memory including ISP processor 407*a*, . . . , 407*n*, ISP memory 407*aa*, . . . , 407*nn*. In some embodiments, data assembler 405*a*, . . . , 405*n* can be coupled to crossbar 1501 that is further coupled to DMA destinations 1505*a*, 1505*b*, . . . , 1505M which can be examples of ISP memory 407*aa*, . . . , 407*nn* or ISP processor 407*a*, . . . , 407*n*. In addition, data assemblers 405*a*, 405*b*, . . . , 405*n* can be coupled to sideband DMA 309*a*, . . . , 309L through a crossbar 1503, where sideband DMA 309*a*, . . . , 309L can be examples of auxiliary data storage 309.

In some embodiments, there can be two different DMA destinations allocated to one virtual channel. For example, DMA destination 1505*a* and 1505*b* are allocated to virtual channel 0, and DMA destination 1505*c* and 1505*d* can be allocated to virtual channel 1.

In some embodiments, data packets can be routed to their associated destination ISP processor or ISP memory downstream using their virtual channel ID and packet type. A data assembler can split the packets into image data packets forming an image data stream and into auxiliary data packets forming a sideband data stream. Image data packets can optionally be passed through an output formatter, which can convert the format of the data packets. Auxiliary data packets or sideband data packets can be further demultiplexed based on packet type and then routed to a sideband DMA destination through a full crossbar, e.g., crossbar 1503.

In some embodiments, data assemblers 405*a*, 405*b*, . . . , 405*n* can perform various functions in addition to assemble data packets into frames generated by sensor sources. A data assembler, e.g., data assembler 405*a*, can guarantee that downstream blocks receive the right amount of data, irrespective of the sensor errors. It also offers others features, such as data unpacking, reporting and correction of various errors. The description below with regard to data assembler 405*a* can be applicable to any of data assemblers 405*a*, 405*b*, . . . , 405*n*.

In some embodiments, data assembler 405*a* can flag an error if it receives too little or too much pixel data compared to the expected amount based on pixel format and image width. If data assembler 405*a* receives too little data, data assembler 405*a* can pad the data with dummy frames until the required amount of data has been received. If too much data is received, the extra data can be dropped. The padded pixels can be placed at the end of frame as data assembler 405*a* cannot determine where the data was dropped. To generate the dummy frames, data assembler 405*a* can insert Os for the pixel data.

In some embodiments, data assembler 405*a* can detect a frame timeout error when data assembler 405*a* receives an indicator to indicate a start of a frame, e.g., start of frame indicator 611*a*, but the corresponding frame does not arrive in time. When data assembler 405*a* determines that the time has passed beyond the pre-programmed time period and frame has not arrived, data assembler 405*a* can generate a dummy frame to be the frame.

In some embodiments, a new frame can be delivered to data assembler 405*a* while data assembler 405*a* is still busy working on a previous frame. Accordingly, data assembler 405*a* can backpressure the new frame (e.g., rejecting the new frame while informing the corresponding queue 415*a* where the new frame is from) to delay the delivery of the new frame without causing a SIFQ overflow. If data assembler 405*a* backpressures the new frame for too long, the new frame can eventually cause a SIFQ overflow at the corresponding queue 415*a*.

In some embodiments, due to various causes, such as queue overflow or link errors, the end packet of a frame can be corrupted or dropped. In such cases, data assembler 405*a* can hang or not perform any operations while waiting indefinitely for the end packet to arrive. In some embodiments, data assembler 405*a* can implement a timeout feature so that data assembler 405*a* can consider the end packet is lost or an error has occurred after waiting for a maximum length of a predetermined time. The predetermined maximum waiting time can be programmed into or stored in a register. A VC router in post-processing device 403 can insert an artificial end packet of the frame when the predetermined maximum waiting time has been reached. Additionally, an interrupt can be raised so that data assembler 405*a* is aware that the frame is being terminated with an artificial end packet of the frame.

In some embodiments, data assembler 405*a* can detect a packet-too-short error if a next start packet for another frame or end packet of the current frame is received before all expected words are received for the current packet. In some embodiments, data assembler 405*a* can continue processing the next packet without padding the error packet to the expected length. If pixels are missing at the end of the frame, a frame-too-short interrupt can be raised as well, and the frame is padded with Os to the full length.

In some embodiments, data assembler 405*a* can detect a packet-too-long error if a start packet of the next frame or the end packet of the current frame is not received after all expected words are received for the current packet. In such cases, data assembler 405*a* can drop all data packet beyond the expected length and then continue processing the next packet. In some embodiments, data assembler 405*a* can detect a frame-too-long error and further truncating data packets as necessary.

In some embodiments, a length field can be optional for auxiliary data packets 413*a* being sent to auxiliary data storage 309, or the sideband DMA 309*a*, . . . , 309L. In some embodiments, the length field decoding can be enabled. In some embodiments, the length field decoding can be disabled by setting a configuration register. If length field decoding is disabled, packet boundaries can be determined by the next start packet of a frame or an end packet of a frame.

Figure 16A:
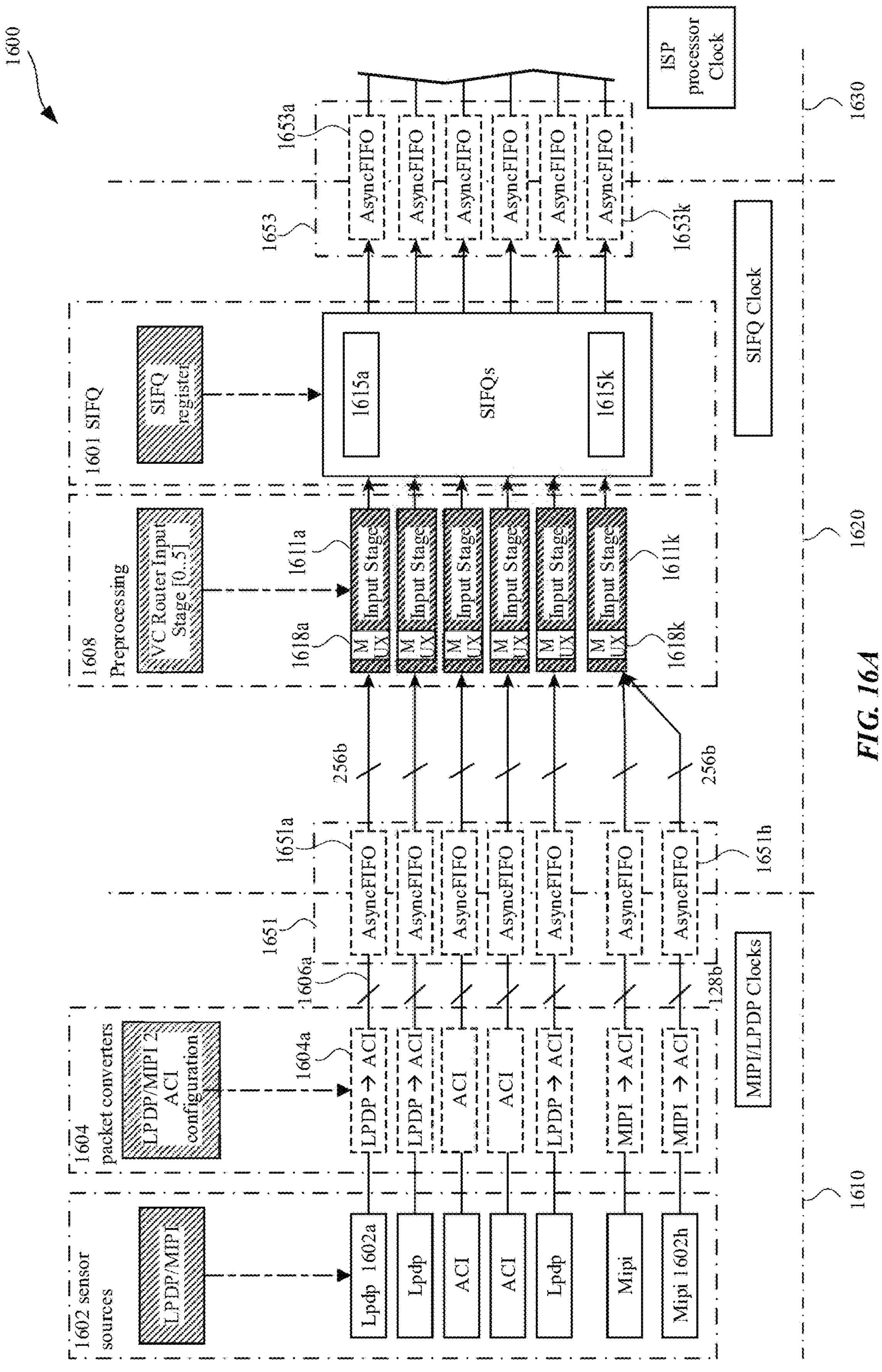
FIGS. 16A and 16B are block diagrams illustrating a SIF system, according to some embodiments.
Figure 16B:
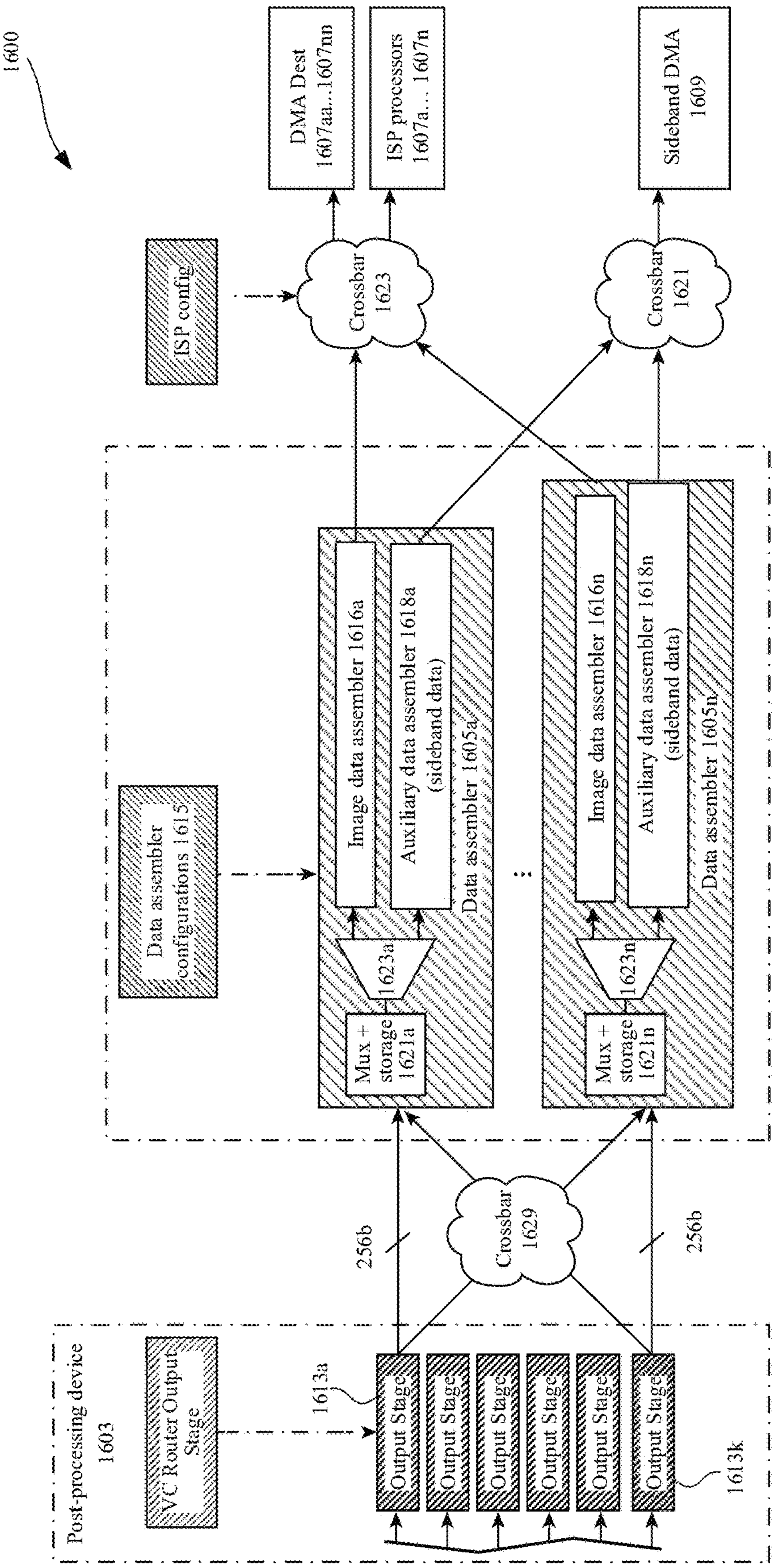

FIGS. 16A and 16B are block diagrams illustrating a SIF system 1600, according to some embodiments. FIG. 16A shows the first part of SIF system 1600 followed by the second part of SIF system 1600 shown in FIG. 16B. In some embodiments, SIF system 1600 can be an implementation of SIF system 400. In some embodiments, SIF system 1600 can include a subsystem 1610, a subsystem 1620, and a subsystem 1630. In some embodiments, components, circuits, and devices of subsystem 1610 can be configured to be operated based on a first clock signal generated by a clock with a first frequency, such as a clock for MIPI or LPDP sensor source. In addition, components, circuits, and devices of subsystem 1620 can be configured to be operated based on a second clock signal generated by a clock, such as a SIFQ clock, which has a second frequency different from the first frequency. In some embodiments, components, circuits, and devices of subsystem 1630 can be configured to be operated based on a third clock signal generated by a clock, such as an ISP processor clock, which has a third frequency different from at least one of the first frequency or the second frequency. In some embodiments, SIF 1600 can include n ISP processors 1607*a*, . . . , 1607*n*, and *h* sensor sources 1602*a*, . . . , 1602*h*, to move data from the h sensor sources to the n ISP processors. In some embodiments, the h sensor sources 1602*a*, . . . , 1602*h* can include LPDP sensor source, MIPI sensor source, ACI sensor source, or other sensor sources.

In some embodiments, the h sensor sources 1602*a*, . . . , 1602*h* can be coupled to h packet converters so that each sensor source is coupled to a packet converter 1604 to convert a frame generated by a sensor source into a set of data packets. In some embodiments, a sensor source may generate data packets instead of frames. For example, an ACI sensor source can directly generate data packets instead of frames. Hence, when a sensor source is an ACI sensor source, no packet converter is used. In some embodiments, a sensor source or a packet converter can generate image data packets or auxiliary data packet or sideband data packets, which is non-image related data.

In some embodiments, SIF system 1600 can include asynchronous queues 1651 including an asynchronous queue 1651*a*, . . . , 1651*h*, placed across the boundary between subsystem 1610 and subsystem 1620. Accordingly, an asynchronous queue can be coupled to a sensor link, e.g., sensor link 1606*a* and packet converter 1604*a* of subsystem 1610 and SIFQ 1601 of subsystem 1620. In some embodiments, sensor link 1606*a* can have a bit width of 128 bits. The asynchronous queue can be configured to receive a set of data packets at the first frequency of the first clock signal generated by the first clock and store the set of data packets. In addition, the asynchronous queue can transmit the set of data packets out of the asynchronous queue at the second frequency of the second clock signal generated by the second clock. In some embodiments, the input to asynchronous queue 1651*a* can have a bit width of 128 bits, while the output of asynchronous queue 1651*a* can have a bit width of 256 bits.

In some embodiments, the number of asynchronous queue 1651*a*, . . . , 1651*h* can be coupled to a number of queue enablers of preprocessing device 1608, one queue enabler for each queue of SIFQ 1601. In some embodiments, a queue enabler can be implemented by a multiplexer circuit. Multiplexer circuit 1618*a* is a queue enabler coupled to queue 1615*a* and can be controlled by a controller of preprocessing device 1608. When multiplexer circuit 1618*a* is enabled, a data packet can enter a buffer storage 1611*a* to be received by queue 1615*a*. Similar operations can be performed for other queue enablers and queues. For example, multiplexer circuit 1618*k* can be a queue enabler coupled to queue 1615*k* and can be controlled by a controller of preprocessing device 1608. When multiplexer circuit 1618*k* is enabled, a data packet can enter a buffer storage 1611*k* to be received by queue 1615*k*.

In some embodiments, SIF system 1600 can include asynchronous queues 1653 including an asynchronous queue 1653*a*, . . . , 1653*k* placed across the boundary between subsystem 1620 and subsystem 1630. Accordingly, an asynchronous queue can be coupled to a queue of SIFQ 1601. For example, asynchronous queue 1653*a* is coupled to queue 1615*a* of SIFQ 1601. Asynchronous queues 1653 can be configured to receive a set of data packets at the second frequency of the second clock signal generated by the second clock for subsystem 1620 and store the set of data packets. In addition, the asynchronous queue can transmit the set of data packets out of the asynchronous queue at the third frequency of the third clock signal generated by third clock of subsystem 1630.

In some embodiments, post-processing device 1603 can include a buffer storage 1613*a* coupled to queue 1615*a* to store data packets received from queue 1615*a*, and a buffer storage 1613*k* coupled to queue 1615*k* to store data packets received from queue 1615*k*, where a buffer storage is coupled to a queue. In some embodiments, post-processing device 1603 can include a crossbar router 1629 that is coupled to all the data assemblers, e.g., data assembler 1605*a*, . . . , data assembler 1605*n*, that can be controlled based on data assembler configurations 1615.

In some embodiments, a number of data assemblers, such as data assemblers 1605*a*, . . . , 1605*n* corresponding to the number of ISP processors 1607*a*, . . . , 1607*n*, are coupled to crossbar router 1629 to receive data packets from buffer storage 1613*a*, . . . , 1613*k*. In some embodiments, each of buffer storage 1613*a*, . . . , 1613*k*, is coupled to all data assembler 1605*a*, . . . , 1605*n*. Data assembler 1605*a* can include image data assembler 1616*a* and an auxiliary data assembler 1618*a* to assemble auxiliary data or sideband data. Multiplexer circuit 1621*a* within data assembler 1605*a* can be controlled to select the incoming data packets from one of buffer storage 1613*a*, . . . , 1613*k*. In addition, a de-multiplexer circuit 1623*a* can separate or classify the incoming data packets into image data packets to be sent to image data assembler 1616*a* or auxiliary data packets to be sent to auxiliary data assembler 1618*a*. Similarly, data assembler 1605*n* can include image data assembler 1616*n* and an auxiliary data assembler 1618*n* to assemble auxiliary data or sideband data. Multiplexer circuit 1621*n* within data assembler 1605*n* can be controlled to select the incoming data packets from one of the buffer storage 1613*a*, . . . , 1613*k*. In addition, a de-multiplexer circuit 1623*n* can separate or classify the incoming data packets into image data packets to be sent to image data assembler 1616*n* or auxiliary data packets to be sent to auxiliary data assembler 1618*n*.

In some embodiments, data assembler 1605*a*, . . . , 1605*n* can be further coupled to sideband DMA 1609, ISP processors 1607*a*, . . . , 1607*n*, or DMA destinations 1607*aa*, . . . , 1607*nn* that are memory storage related to ISP processors 1607*a*, . . . , 1607*n*. Image related data packets can be assembled into frames and transmitted into DMA destinations 1607*aa*, . . . , 1607*nn* or ISP processors 1607*a*, . . . , 1607*n*. In addition, non-image related or auxiliary data packets can be transmitted to sideband DMA 1609.

Figure 17:
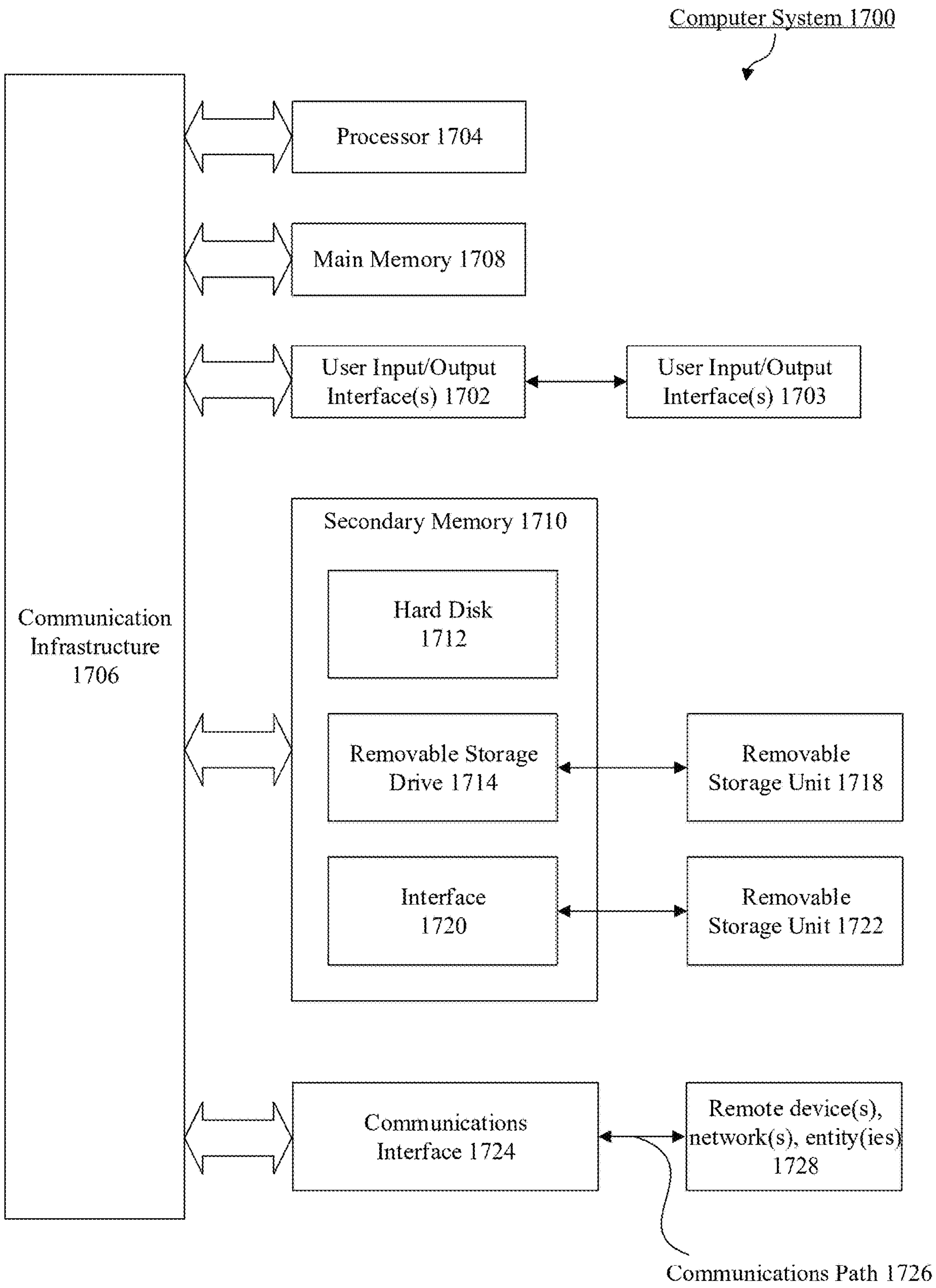
FIG. 17 is an illustration of an example computer system for implementing some embodiments or portion(s) thereof of the disclosure provided herein, according to some embodiments.

Various embodiments can be implemented, for example, using one or more computer systems, such as computer system 1700 shown in FIG. 17. Computer system 1700 can be any computer capable of performing the functions described herein for SIF system 400, SIF system 1000, SIF system 1600, or operations described in process 500, process 700, process 900, state diagram 1100, state diagram 1400, as shown in FIGS. 3-16. Computer system 1700 includes one or more processors (also called central processing units, or CPUs), such as a processor 1704. Processor 1704 is connected to a communication infrastructure 1706 (e.g., a bus). Computer system 1700 also includes user input/output device(s) 1703, such as monitors, keyboards, and pointing devices, that communicate with communication infrastructure 1706 through user input/output interface(s) 1702. Computer system 1700 also includes a main or primary memory 1708, such as random access memory (RAM). Main memory 1708 can include one or more levels of cache. Main memory 1708 has stored therein control logic (e.g., computer software) and/or data.

Computer system 1700 can also include one or more secondary storage devices or memory 1710. Secondary memory 1710 can include, for example, a hard disk drive 1712 and/or a removable storage device or drive 1714. Removable storage drive 1714 can be a floppy disk drive, a magnetic tape drive, a compact disk drive, an optical storage device, tape backup device, and/or any other storage device/drive.

Removable storage drive 1714 can interact with a removable storage unit 1718. Removable storage unit 1718 includes a computer usable or readable storage device having stored thereon computer software (e.g., control logic) and/or data. Removable storage unit 1718 can be a floppy disk, magnetic tape, compact disk, DVD, optical storage disk, and/any other computer data storage device. Removable storage drive 1714 reads from and/or writes to removable storage unit 1718 in a well-known manner.

According to some embodiments, secondary memory 1710 can include other means, instrumentalities or other approaches for allowing computer programs and/or other instructions and/or data to be accessed by computer system 1700. Such means, instrumentalities or other approaches can include, for example, a removable storage unit 1722 and an interface 1720. Examples of the removable storage unit 1722 and the interface 1720 can include a program cartridge and cartridge interface (such as that found in video game devices), a removable memory chip (e.g., an EPROM or PROM) and associated socket, a memory stick and USB port, a memory card and associated memory card slot, and/or any other removable storage unit and associated interface.

In some examples, main memory 1708, the removable storage unit 1718, the removable storage unit 1722 can store instructions that, when executed by processor 1704, cause processor 1704 to perform operations for SIF system 400, SIF system 1000, SIF system 1600, or operations described in process 500, process 700, process 900, state diagram 1100, state diagram 1400, as shown in FIGS. 3-16.

Computer system 1700 can further include a communication or network interface 1724. Communication interface 1724 enables computer system 1700 to communicate and interact with any combination of remote devices, remote networks, remote entities, and other suitable devices (individually and collectively referenced by reference number 1728). For example, communication interface 1724 can allow computer system 1700 to communicate with remote devices 1728 over communications path 1726, which can be wired and/or wireless, and which can include any combination of LANs, WANs, the Internet, and any other suitable networks. Control logic and/or data can be transmitted to and from computer system 1700 via communication path 1726.

The operations in the preceding embodiments can be implemented in a wide variety of configurations and architectures. Therefore, one or more operations in the preceding embodiments can be performed in hardware, in software, or both. In some embodiments, a tangible, non-transitory apparatus or article of manufacture includes a tangible, non-transitory computer useable or readable medium having control logic (e.g., software) stored thereon is also referred to herein as a "computer program product" or "program storage device." This includes, but is not limited to, computer system 1700, main memory 1708, secondary memory 1710 and removable storage units 1718 and 1722, as well as tangible articles of manufacture embodying any combination of the foregoing. Such control logic, when executed by one or more data processing devices (e.g., computer system 1700), causes such data processing devices to operate as described herein.

Based on the teachings in this disclosure, it will be apparent to persons skilled in the relevant art(s) how to make and use embodiments of the disclosure using data processing devices, computer systems and/or computer architectures other than that shown in FIG. 17. In particular, embodiments can operate with software, hardware, and/or operating system implementations other than those described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure can discuss potential advantages that can arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages can depend on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (e.g., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (e.g., having the potential to, being able to) and not in a mandatory sense (e.g., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers (1) x but not y, (2) y but not x, and (3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," and "given circuit") refer to different instances of the feature. Additionally, the labels "first," "second," and "third" when applied to a feature do not imply any type of ordering (e.g., spatial, temporal, and logical), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

In this disclosure, different entities (which may variously be referred to as "units," "circuits," and "other components") may be described or claimed as "configured" to perform one or more tasks or operations. This formulation—[entity] configured to [perform one or more tasks]—is used herein to refer to structure (e.g., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, and latches), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, and memory management unit (MMU)). Such units also refer to circuits or circuitry.

The disclosed circuits/units/components and other elements illustrated in the drawings and described herein thus include hardware elements such as those described in the preceding paragraph. In many instances, the internal arrangement of hardware elements in a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description can be expressed in a fashion that may appear to be functional. But to those of skill in the art in this field, this HDL description is the manner that is used to transform the structure of a circuit, unit, or component to the next level of implementational detail. Such an HDL description may take the form of behavioral code (which may not be synthesizable), register transfer language (RTL) code (which, in contrast to behavioral code, may be synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, and inductors) and interconnect between the transistors and circuit elements. Some embodiments may implement multiple integrated circuits coupled to one another to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system, comprising:
- a sensor interface queue (SIFQ) coupled to a first sensor link and a second sensor link and comprising a first queue and a second queue, wherein the first queue is configured to store a first set of data packets received from the first sensor link, wherein the second queue is configured to store a second set of data packets received from the second sensor link, and wherein the first set of data packets and the second set of data packets share a same data packet format;
- a first data assembler coupled to the SIFQ and to a first signal processor and configured to:
  - assemble the first set of data packets into first data in a first frame format for processing by the first signal processor, and
  - detect an error associated with assembling the first data in the first frame format; and
- a second data assembler coupled to the SIFQ and to a second signal processor and configured to assemble the second set of data packets into second data in a second frame format for processing by the second signal processor.

2. The system of claim 1, wherein, to detect the error associated with assembling the first data, the first data assembler is further configured to determine a difference between a first number of data packets received from the first queue and a second number of data packets expected to be received from the first queue based on the first frame format.

3. The system of claim 2, wherein, in response to determining that the first number of data packets is smaller than the second number of data packets, the first data assembler is further configured to generate one or more dummy packets of a dummy frame to increase the first number of data packets received from the first queue to be equal to the second number of data packets expected to be received from the first queue.

4. The system of claim 3, wherein the dummy frame is placed at an end of the first data after the first data has been assembled.

5. The system of claim 1, wherein, to detect the error associated with assembling the first data, the first data assembler is further configured to determine that a predetermined time period has expired before receiving a start packet of a frame.

6. The system of claim 1, wherein, to detect the error associated with assembling the first data, the first data assembler is further configured to determine that a data packet of a frame is received before receiving a start packet of the frame.

7. The system of claim 1, wherein, to detect the error associated with assembling the first data, the first data assembler is further configured to determine that a predetermined time period has expired before receiving an end packet of a frame.

8. The system of claim 1, wherein, to detect the error associated with assembling the first data, the first data assembler is further configured to determine that a length of a received data packet is not equal to a packet length indicated by a header of the received data packet.

9. The system of claim 1, wherein, to detect the error associated with assembling the first data, the first data assembler is further configured to determine that the error is based on an error correction coding mechanism.

10. The system of claim 1, wherein a data packet of the first set of data packets comprises a header indicating that:
- the data packet is an auxiliary data packet of auxiliary data associated with non-image related data, or
- the data packet is an image data packet of image data.

11. The system of claim 1, further comprising:
- a first packet converter coupled to a first sensor source and configured to generate the first set of data packets for a first set of frames in the first frame format captured by the first sensor source.

12. The system of claim 1, wherein:
- the SIFQ comprises a first number of queues including the first queue and the second queue,
- the SIFQ is coupled to a second number of sensor links including the first sensor link and the second sensor link, a sensor link being coupled to a corresponding sensor source,
- the SIFQ is further coupled to a third number of data assemblers including the first data assembler and the second data assembler, a data assembler being coupled to a corresponding signal processor, and
- the first number is different from at least one of the second number and the third number.

13. A method performed by a system, comprising:
- assembling, by a first data assembler coupled to a sensor interface queue (SIFQ) and to a first signal processor, a first set of data packets into first data in a first frame format for processing by the first signal processor, wherein the SIFQ is coupled to a first sensor link and a second sensor link and comprising a first queue and a second queue;
- storing, in the first queue, the first set of data packets received from the first sensor link;
- storing, in the second queue, a second set of data packets received from the second sensor link, wherein the first set of data packets and the second set of data packets share a same data packet format;
- detecting, by the first data assembler, an error associated with assembling the first data in the first frame format; and
- assembling, by a second data assembler coupled to the SIFQ and to a second signal processor, the second set of data packets into second data in a second frame format for processing by the second signal processor.

14. The method of claim 13, wherein the detecting the error associated with assembling the first data comprises determining a difference between a first number of data packets received from the first queue and a second number of data packets expected to be received from the first queue based on the first frame format.

15. The method of claim 14, further comprising:
- in response to determining that the first number of data packets is smaller than the second number of data packets, generating one or more dummy packets of a dummy frame to increase the first number of data packets received from the first queue to be equal to the second number of data packets expected to be received from the first queue.

16. The method of claim 13, wherein the detecting the error associated with assembling the first data comprises determining that a predetermined time period has expired before receiving a start packet of a frame.

17. A system, comprising:

a sensor interface queue (SIFQ) comprising a first number of queues comprising a first queue and a second queue;

a second number of sensor links coupled to the SIFQ and comprising a first sensor link coupled to the first queue and a second sensor link coupled to the second queue, a sensor link being coupled to a corresponding sensor source, wherein the first queue is configured to store a first set of data packets received from the first sensor link, wherein the second queue is configured to store a second set of data packets received from the second sensor link, and wherein the first set of data packets and the second set of data packets share a same data packet format; and a third number of data assemblers comprising a first data assembler and a second data assembler, a data assembler being coupled to a corresponding signal processor, and wherein:

the first data assembler is coupled to the SIFQ and to a first signal processor and configured to:

assemble the first set of data packets into first data in a first frame format for processing by the first signal processor, and detect an error associated with assembling the first data in the first frame format; and the second data assembler is coupled to the SIFQ and to a second signal processor and configured to assemble the second set of data packets into second data in a second frame format for processing by the second signal processor.

18. The system of claim 17, wherein the first frame format is different from the second frame format.

19. The system of claim 17, further comprising:

a first packet converter configured to generate the first set of data packets received through the first sensor link and coupled to a first sensor source configured to generate a first plurality of frames in the first frame format; and a second packet converter configured to generate the second set of data packets received through the second sensor link and coupled to a second sensor source configured to generate a second plurality of frames in the second frame format.

20. The system of claim 17, wherein a data packet of the first set of data packets comprises a header comprising a virtual channel identifier corresponding to a virtual channel between the first data assembler and the first signal processor.

* * * * *